US010671445B2

(12) United States Patent
Nucci et al.

(10) Patent No.: US 10,671,445 B2
(45) Date of Patent: Jun. 2, 2020

(54) COST-OPTIMAL CLUSTER CONFIGURATION ANALYTICS PACKAGE

(71) Applicant: Cisco Technology, Inc., San Jose, CA (US)

(72) Inventors: Antonio Nucci, San Jose, CA (US); Dragan Milosavljevic, Cupertino, CA (US); Ping Pamela Tang, San Jose, CA (US); Athena Wong, Cupertino, CA (US); Alex V. Truong, San Jose, CA (US); Alexander Sasha Stojanovic, Los Gatos, CA (US); John Oberon, San Francisco, CA (US); Prasad Potipireddi, Fremont, CA (US); Ahmed Khattab, San Jose, CA (US); Samudra Harapan Bekti, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 15/830,490

(22) Filed: Dec. 4, 2017

(65) Prior Publication Data
US 2019/0171494 A1    Jun. 6, 2019

(51) Int. Cl.
*G06N 5/02* (2006.01)
*G06F 9/50* (2006.01)

(52) U.S. Cl.
CPC ............ *G06F 9/5088* (2013.01); *G06F 9/505* (2013.01); *G06N 5/02* (2013.01)

(58) Field of Classification Search
None
See application file for complete search history.

(56) References Cited

U.S. PATENT DOCUMENTS

| 7,712,100 B2 * | 5/2010 | Fellenstein | G06Q 40/04 705/37 |
| 2010/0299366 A1 * | 11/2010 | Stienhans | G06F 9/5072 707/803 |

(Continued)

OTHER PUBLICATIONS

Lama et al., "AROMA: Automated Resource Allocation and Configuration of MapReduce Environment in the Cloud," Proceedings of the 9th International Conference on Autonomic Computing, Sep. 2012, pp. 1-10.

(Continued)

*Primary Examiner* — Isaac T Tecklu
(74) *Attorney, Agent, or Firm* — Polsinelli PC

(57) ABSTRACT

Systems, methods, and computer-readable media for identifying an optimal cluster configuration for performing a job in a remote cluster computing system. In some examples, one or more applications and a sample of a production load as part of a job for a remote cluster computing system is received. Different clusters of nodes are instantiated in the remote cluster computing system to form different cluster configurations. Multi-Linear regression models segmented into different load regions are trained by running at least a portion of the sample on the instantiated different clusters of nodes. Expected completion times of the production load across varying cluster configurations are identified using the multi-linear regression models. An optimal cluster configuration of the varying cluster configurations is determined for the job based on the identified expected completion times.

20 Claims, 17 Drawing Sheets

(56) References Cited

U.S. PATENT DOCUMENTS

| | | | |
|---|---|---|---|
| 2011/0191781 A1* | 8/2011 | Karanam | G06F 9/50 718/104 |
| 2014/0047342 A1* | 2/2014 | Breternitz | G06F 9/5061 715/735 |
| 2014/0115592 A1* | 4/2014 | Frean | G06F 9/5027 718/102 |
| 2015/0039764 A1* | 2/2015 | Beloglazov | H04L 47/70 709/226 |
| 2015/0067680 A1* | 3/2015 | Phelan | G06F 9/541 718/1 |
| 2015/0186228 A1* | 7/2015 | Kumar | G06F 11/2028 714/4.12 |
| 2016/0359697 A1* | 12/2016 | Scheib | H04L 63/1425 |
| 2017/0132042 A1* | 5/2017 | Cherkasova | G06F 9/5061 |
| 2017/0200113 A1* | 7/2017 | Cherkasova | G06F 9/5072 |
| 2017/0228676 A1* | 8/2017 | Cherkasova | G06F 9/5066 |
| 2018/0150783 A1* | 5/2018 | Xu | G06N 20/00 |
| 2018/0159727 A1* | 6/2018 | Liu | H04L 41/145 |
| 2019/0155643 A1* | 5/2019 | Bhageria | H04L 9/008 |

OTHER PUBLICATIONS

Garcia-Galan et al., "Automated Configuration Support for Infrastructure Migration to the Cloud," Mar. 2015, pp. 1-19.
Herodotou et al., "No One (Cluster) Size Fits All: Automatic Cluster Sizing for Data-Intensive Analytics," Proceedings of the 2nd ACM Symposium on Cloud Computing, Oct. 2011, pp. 1-12.

* cited by examiner

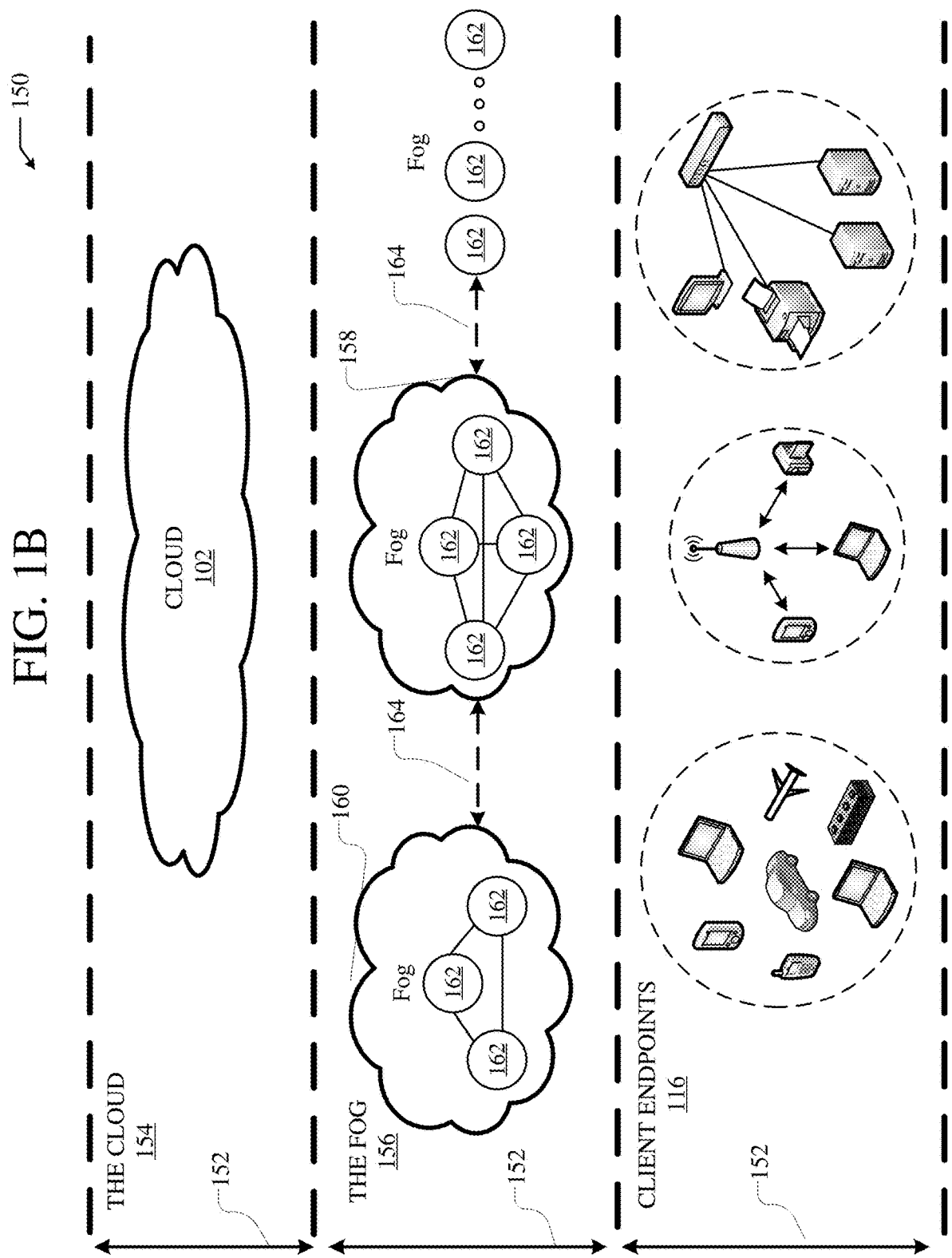

FIG. 10

```
set INSTANCE := m3large ;
set MACHINE := n1 n2 n3 n4 n5 n6 n7 n8 n9 n10 n11 n12 n13 n14 n15 ;

param SLO:=90;

param time_estimate (tr):
                                          m3large :=
          n1 122.9077364
                    n2 94.80839134
                    n3 87.21047894
                    n4 84.73792471
                    n5 84.31551374
                    n6 84.91817441
                    n7 86.10659029
                    n8 87.66110318
                    n9 89.45968075
                    n10 91.4291036
                    n11 93.52277754
                    n12 95.70963982
                    n13 97.96818543
                    n14 100.2830537
                    n15 102.64298 ;

param cost_estimate (tr):
                                          m3large :=
          n1 0.00007388
                    n2 0.00014777
                    n3 0.00022167
                    n4 0.01
                    n5 0.02
                    n6 0.03
                    n7 0.04
                    n8 0.05
                    n9 0.06
                    n10 0.07
                    n11 0.08
                    n12 0.09
                    n13 0.10
                    n14 0.11
                    n15 0.12 ;
```

COST-OPTIMAL CLUSTER CONFIGURATION ANALYTICS PACKAGE

TECHNICAL FIELD

The present technology pertains to remote cluster computing, and in particular to identifying an optimal cluster configuration for a specific job in a remote cluster computing system.

BACKGROUND

Users can outsource hosting of applications and other services to cloud service providers, e.g. Amazon®, Rackspace®, Microsoft® etc. More specifically, applications can be run on virtual machine instances in the cloud as part of outsourcing hosting of applications and other services to cloud service provider. In cases where data-intensive jobs are outsourced to the cloud, jobs are typically performed on clusters of virtual machines instances, often times in parallel. A wide variety of different virtual machine instance types are available for hosting applications and other services in the cloud. In order to outsource hosting of applications and other services, including data-intensive jobs, a user has to select virtual machine instance types to perform jobs. Additionally, in order to outsource jobs to the cloud, a user has to select a number of nodes or virtual machine instances to add to a cluster of virtual machine instances in order to perform the jobs. Costs of using the different types of virtual machine instances vary based on the instance type and the number of virtual machine instances used. Accordingly, a cost of outsourcing a job in the cloud is a function of both a number of virtual machine instances used and types of virtual machine instances used, e.g. as part of a cluster configuration.

Currently, users can choose virtual machine types by arbitrarily selecting machine types or by using previous experiences of outsourcing similar jobs to the cloud. This is problematic because users might define cluster configurations unsuitable for performing a specific job. For example, a user might select more expensive virtual machine instance types to perform a job while less expensive virtual machine instance types could have just as effectively performed the job. There therefore exists a need for automating cluster configuration selection for outsourced jobs in order to minimize usage costs.

Further, outsourced jobs typically need to be completed within a specific amount of time, e.g. a service level objective deadline has to be met. In order to ensure service level objective deadlines are met, users typically scale out by adding virtual machine instances to a cluster. This is often done irrespective of the actual cost to scaling out and whether the scaling out is actually needed to perform the job by the service level objective deadline. There therefore exists a need for automating cluster configuration selection for jobs outsourced to the cloud in order to minimize usage costs while ensuring the service level objectives for the jobs are still met, e.g. a cost-optimal cluster configuration.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates a diagram of an example fog computing architecture;

FIG. 10 shows a sample of input used to identify an optimal cluster configuration;

DESCRIPTION OF EXAMPLE EMBODIMENTS

Figure 1A:
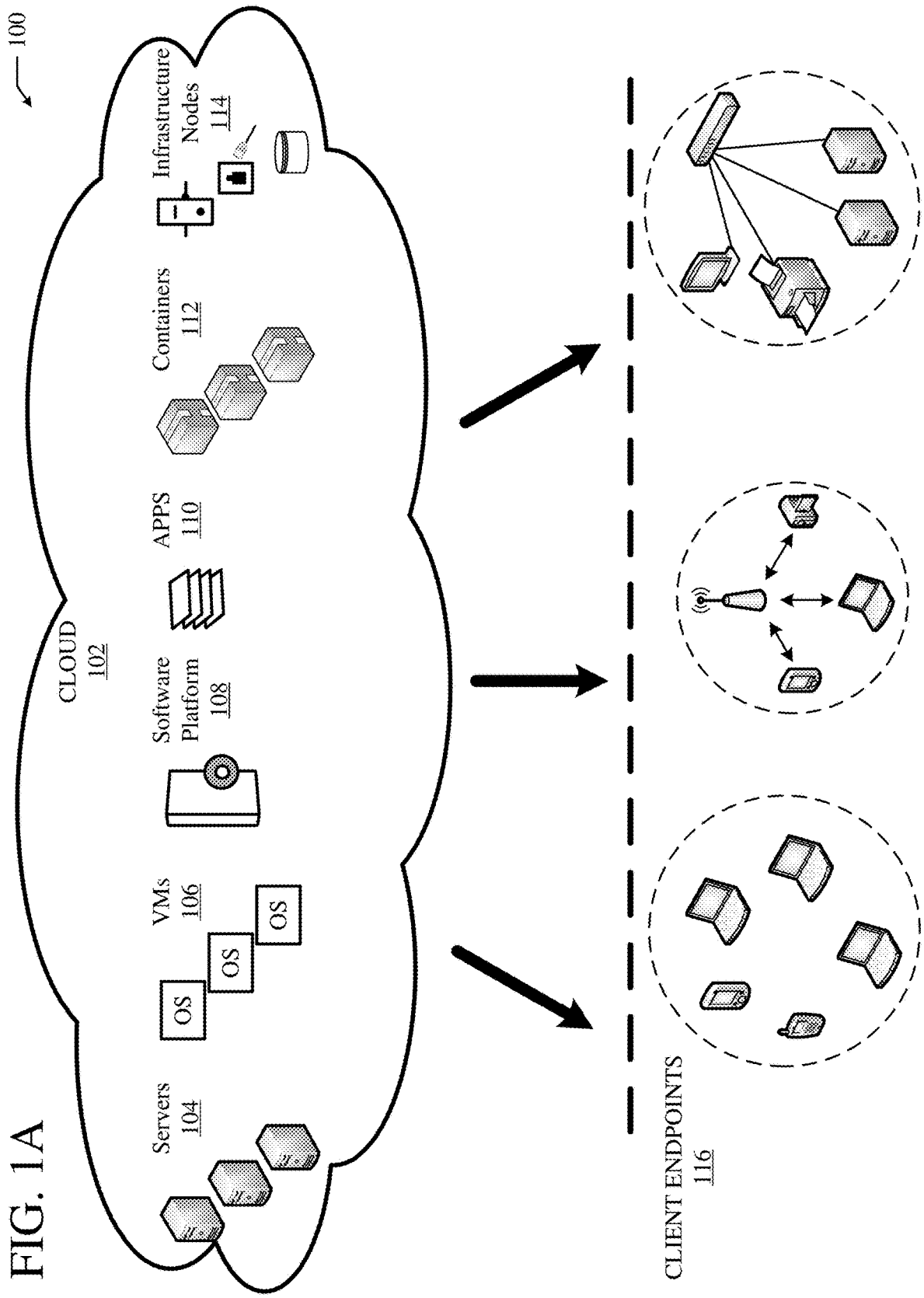
FIG. 1A illustrates a diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving job input including one or more applications and a sample of a production load of a job to be outsources to a remote cluster computing system. An application recommendation vector can be created for the job independent of cluster configuration using the job input. The method can also include instantiating different clusters of nodes to form different cluster configurations in the remote cluster computing system. The job can be forecasted in the remote cluster computing system by identifying expected completion times of the production load across varying cluster configurations using one or more multi-linear regression models segments into parts by different load regions. The one or more multi-linear regression models can be trained by running at least a portion of the sample of production load on the different clusters of nodes with the different cluster configurations in the remote cluster computing system using the one or more applications based on the application recommendation vector. Subsequently, an optimal cluster configuration of the varying cluster configurations for the job in the remote cluster computing system can be selected based on the identified expected completion times of the production load across the varying cluster configurations.

A system can receive job input including one or more applications and a sample of a production load of a job to be outsourced to a remote cluster computing system. An application recommendation vector can be created for the job independent of cluster configuration using the job input. The system can instantiate different clusters of nodes to form different cluster configurations in the remote cluster computing system by varying one or a combination of hardware parameters of one or more nodes in the cluster of nodes to form the different cluster configurations, a number of nodes of the one or more nodes in the cluster of nodes to form the different cluster configurations, and resource allocation of the one or more nodes in the cluster of nodes to form the different cluster configurations. Subsequently, the system can forecast the job in the remote cluster computing system by identifying expected completion times of the production load across varying cluster configurations using one or more multi-linear regression models segmented into parts by different load regions. The one or more multi-linear regression models can be trained by running at least a portion of the sample of production load on the different clusters of nodes with the different cluster configurations in the remote cluster computing system using the one or more applications based on the application recommendation vector. The system can then identify an optimal cluster configuration of the varying cluster configurations for the job in the remote cluster computing system based on the identified expected completion times of the production load across the varying cluster configurations.

A system can receive job input including one or more applications and a sample of a production load of a job to be outsourced to a remote cluster computing system. The system can instantiate different clusters of nodes to form different cluster configurations in the remote cluster computing system. Subsequently, the system can forecast the job in the remote cluster computing system by identifying expected completion times of the production load across varying cluster configurations using one or more multi-linear regression models segmented into parts by different load regions. The one or more multi-linear regression models can be trained by running at least a portion of the sample of production load on the different clusters of nodes with the different cluster configurations in the remote cluster computing system using the one or more applications. The system can then identify an optimal cluster configuration of the varying cluster configurations for the job in the remote cluster computing system based on the identified expected completion times of the production load across the varying cluster configurations.

DESCRIPTION

The disclosed technology addresses the need in the art for efficient resource usage in remote cluster computing systems. The present technology involves system, methods, and computer-readable media for cost-optimized resource usage in remote cluster computing systems.

Figure 12:
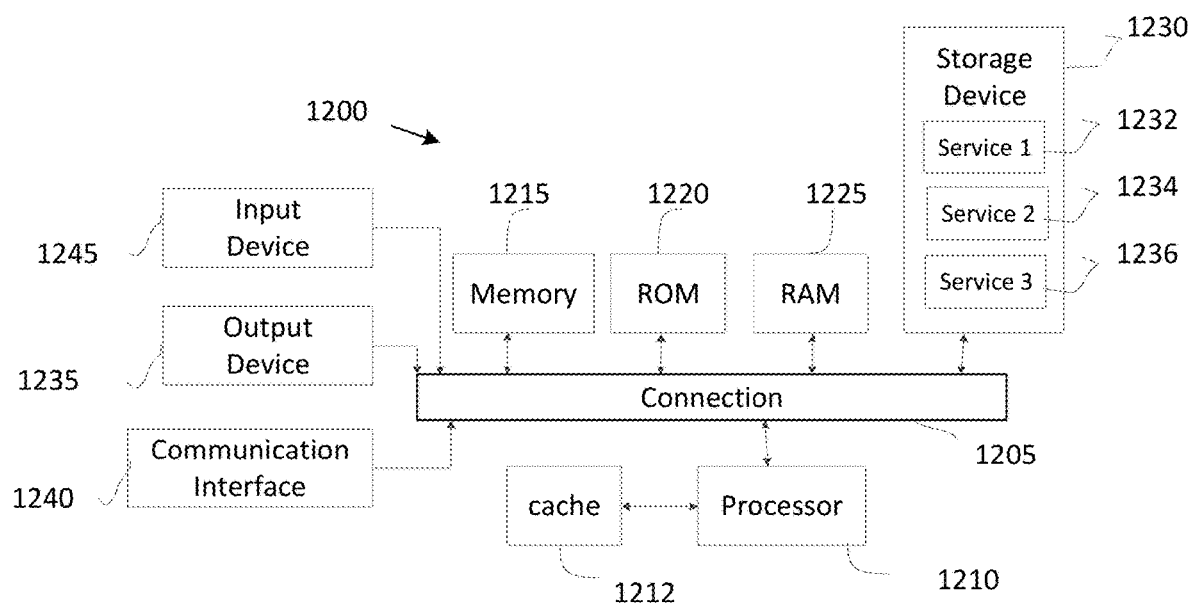
FIG. 12 illustrates an example network device.
Figure 13:
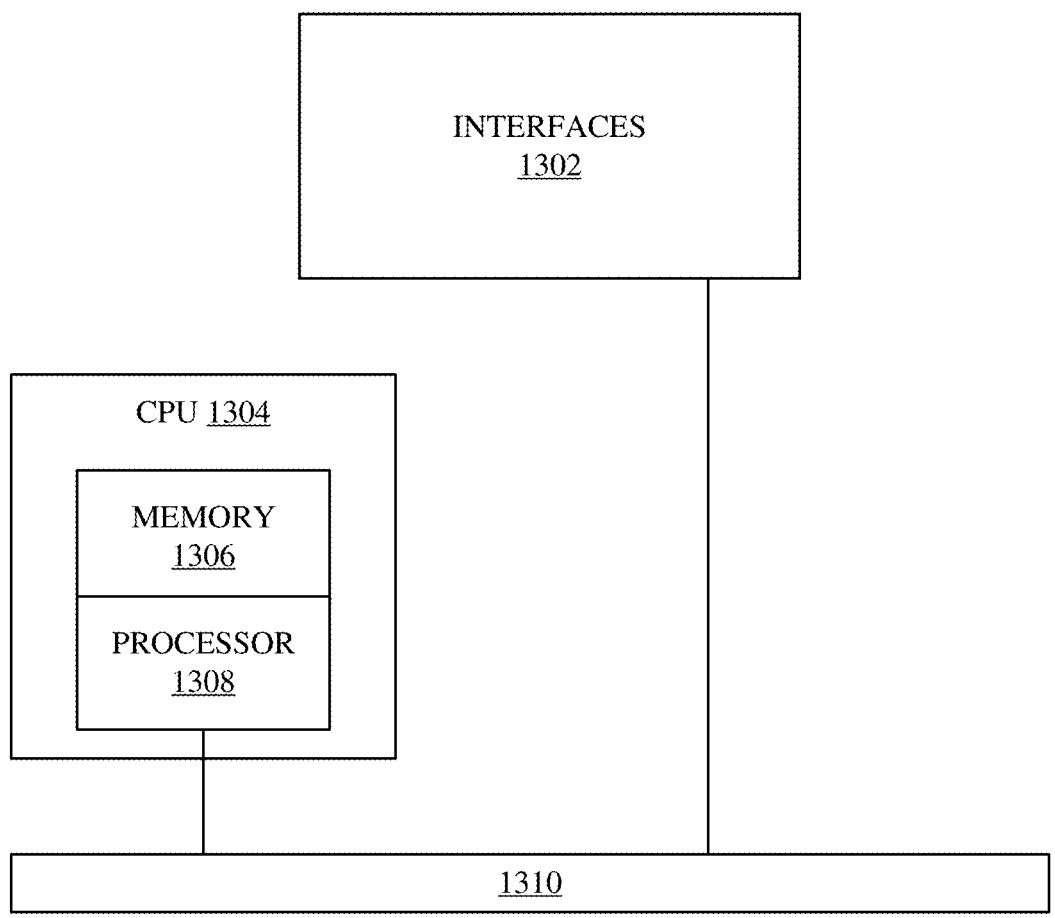
FIG. 13 illustrates am example computing system architecture.

A description of network environments and architectures for network data access and services, as illustrated in FIGS. 1A, 1B, 2A, and 2B, is first disclosed herein. A discussion of systems and methods for identifying optimal cluster configurations for a job in a remote cluster computing system, as shown in FIGS. 3-11, will then follow. The discussion then concludes with a brief description of example devices, as illustrated in FIGS. 12 and 13. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104, 106, 108, 11, 112, and 114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
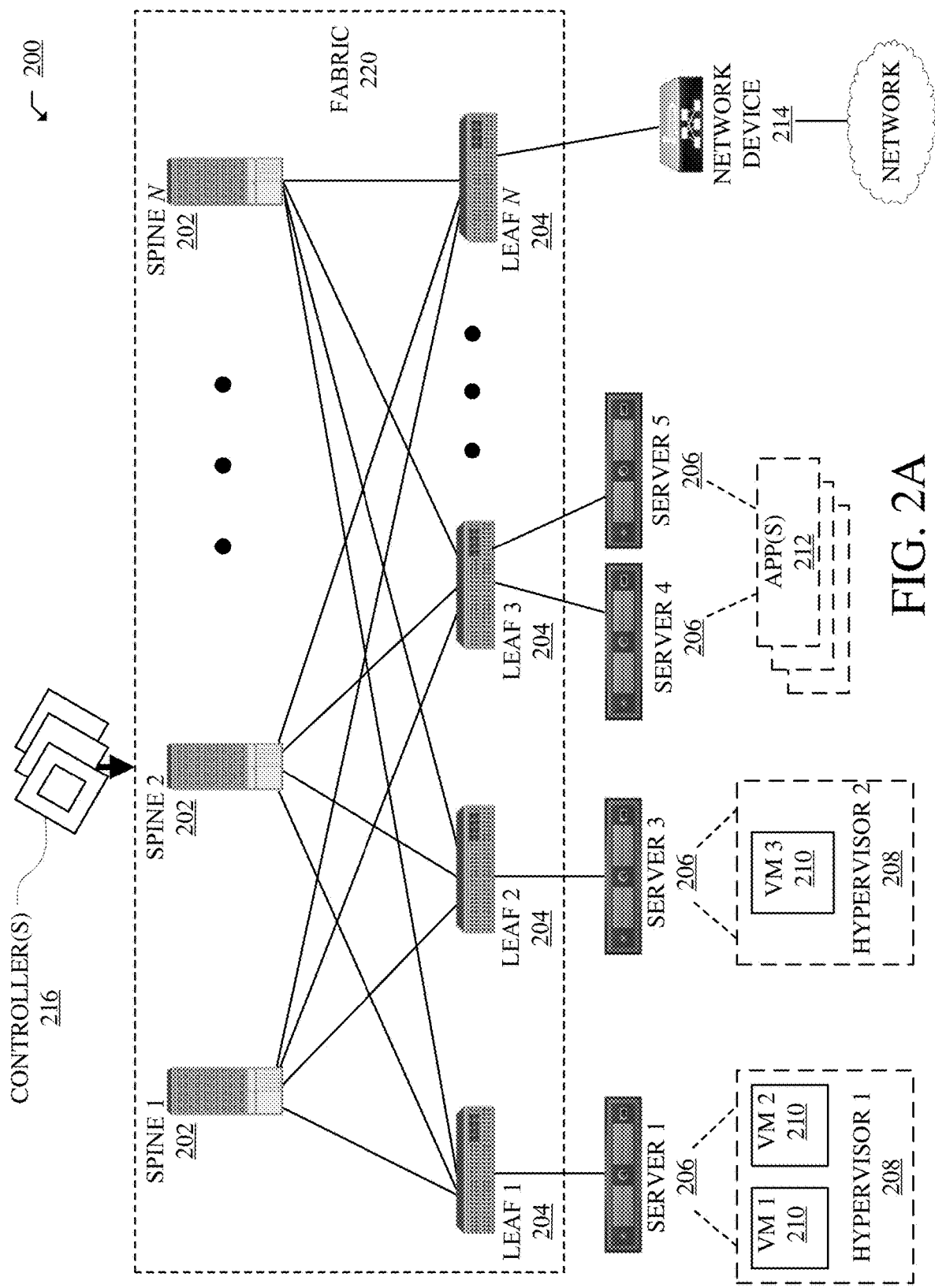
FIG. 2A illustrates a diagram of an example network environment, such as a data center.

FIG. 2A illustrates a diagram of an example network environment 200, such as a data center. In some cases, the network environment 200 can include a data center, which can support and/or host the cloud 102. The network environment 200 can include a fabric 220 which can represent the physical layer or infrastructure (e.g., underlay) of the network environment 200. Fabric 220 can include spines 202 (e.g., spine routers or switches) and leafs 204 (e.g., leaf routers or switches) which can be interconnected for routing or switching traffic in the fabric 220. spines 202 can interconnect leafs 204 in the fabric 220, and leafs 204 can connect the fabric 220 to an overlay or logical portion of the network environment 200, which can include application services, servers, virtual machines, containers, endpoints, etc. Thus, network connectivity in the fabric 220 can flow from spines 202 to leafs 204, and vice versa. The interconnections between leafs 204 and spines 202 can be redundant (e.g., multiple interconnections) to avoid a failure in routing. In some embodiments, leafs 204 and spines 202 can be fully connected, such that any given leaf is connected to each of the spines 202, and any given spine is connected to each of the leafs 204. leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more controllers 216, and/or implemented or enforced by one or more devices, such as leafs 204. Leafs 204 can connect other elements to the fabric 220. For example, leafs 204 can connect servers 206, hypervisors 208, virtual machines (VMs) 210, applications 212, network device 214, etc., with fabric 220. Such elements can reside in one or more logical or virtual layers or networks, such as an overlay network. In some cases, leafs 204 can encapsulate and decapsulate packets to and from such elements (e.g., servers 206) in order to enable communications throughout network environment 200 and fabric 220. Leafs 204 can also provide any other devices, services, tenants, or workloads with access to fabric 220. In some cases, servers 206 connected to leafs 204 can similarly encapsulate and decapsulate packets to and from leafs 204. For example, servers 206 can include one or more virtual switches or routers or tunnel endpoints for tunneling packets between an overlay or logical layer hosted by, or connected to, servers 206 and an underlay layer represented by fabric 220 and accessed via leafs 204.

Applications 212 can include software applications, services, containers, appliances, functions, service chains, etc. For example, applications 212 can include a firewall, a database, a CDN server, an IDS/IPS, a deep packet inspection service, a message router, a virtual switch, etc. An application from applications 212 can be distributed, chained, or hosted by multiple endpoints (e.g., servers 206, VMs 210, etc.), or may run or execute entirely from a single endpoint. VMs 210 can be virtual machines hosted by hypervisors 208 or virtual machine managers running on servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on servers 206, and the hardware resources on Servers 206 to appear as multiple, separate hardware platforms. Moreover, hypervisors 208 on servers 206 can host one or more VMs 210.

In some cases, VMs 210 and/or hypervisors 208 can be migrated to other servers 206. Servers 206 can similarly be migrated to other locations in network environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more servers 206, hypervisors 208, and/or VMs 210 can represent or reside in a tenant or customer space. Tenant space can include workloads, services, applications, devices, networks, and/or resources that are associated with one or more clients or subscribers. Accordingly, traffic in network environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by controllers 216, servers 206, leafs 204, etc.

Configurations in network environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through controllers 216, which can implement or propagate such configurations through network environment 200. In some examples, controllers 216 can be Application Policy Infrastructure Controllers (APICs) in an ACI framework. In other examples, controllers 216 can be one or more management components for associated with other SDN solutions, such as NSX Managers.

Such configurations can define rules, policies, priorities, protocols, attributes, objects, etc., for routing and/or classifying traffic in network environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in network environment 200, such as leafs 204, servers 206, hypervisors 208, controllers 216, etc. As previously explained, network environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to network environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, leafs 204 can tie packets with their attribute EPGs based on their identifiers and enforce policies, which can be implemented and/or managed by one or more controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic.

Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, network environment 200 can deploy different hosts via leafs 204, servers 206, hypervisors 208, VMs 210, applications 212, and controllers 216, such as VMWARE ESXi hosts, WINDOWS HYPER-V hosts, bare metal physical hosts, etc. Network environment 200 may interoperate with a variety of hypervisors 208, servers 206 (e.g., physical and/or virtual servers), SDN orchestration platforms, etc. network environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, controllers 216 can define and manage application-level model(s) for configurations in network environment 200. In some cases, application or device configurations can also be managed and/or defined by other components in the network. For example, a hypervisor or virtual appliance, such as a VM or container, can run a server or management tool to manage software and services in network environment 200, including configurations and settings for virtual appliances.

As illustrated above, network environment 200 can include one or more different types of SDN solutions, hosts, etc. For the sake of clarity and explanation purposes, various examples in the disclosure will be described with reference to an ACI framework, and controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to servers 206 (e.g., physical or logical), hypervisors 208, VMs 210, containers (e.g., applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
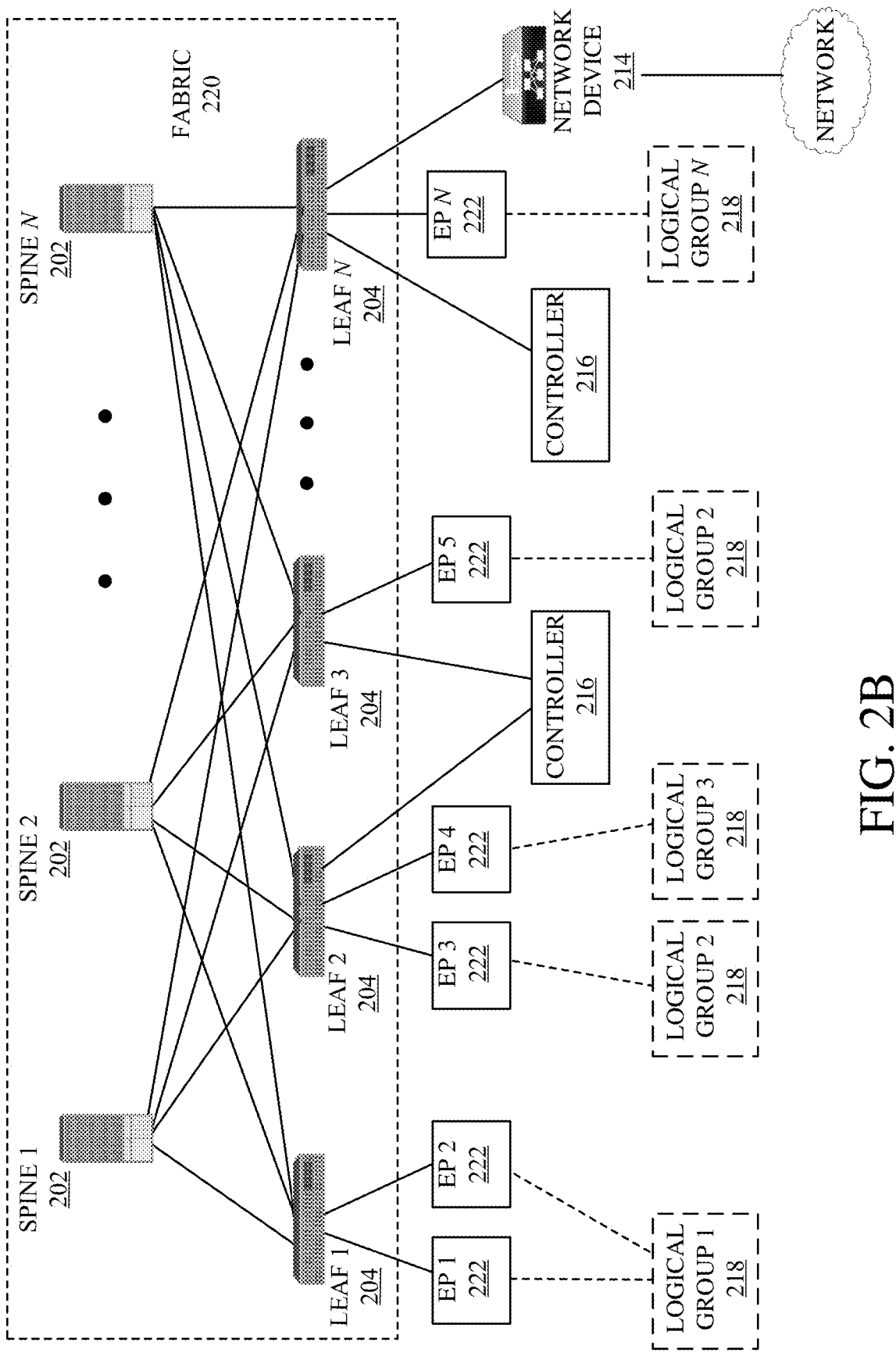
FIG. 2B illustrates another example of a network environment.

FIG. 2B illustrates another example of network environment 200. In this example, network environment 200 includes endpoints 222 connected to leafs 204 in fabric 220. Endpoints 222 can be physical and/or logical or virtual entities, such as servers, clients, VMs, hypervisors, software containers, applications, resources, network devices, workloads, etc. For example, an endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 222 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective logical groups 218. Logical groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, logical group N can contain database server endpoints, etc. In some examples, logical groups 218 are EPGs in an ACI environment and/or other logical groups (e.g., SGs) in another SDN environment.

Traffic to and/or from endpoints 222 can be classified, processed, managed, etc., based logical groups 218. For example, logical groups 218 can be used to classify traffic to or from endpoints 222, apply policies to traffic to or from endpoints 222, define relationships between endpoints 222, define roles of endpoints 222 (e.g., whether an endpoint consumes or provides a service, etc.), apply rules to traffic to or from endpoints 222, apply filters or access control lists (ACLs) to traffic to or from endpoints 222, define communication paths for traffic to or from endpoints 222, enforce requirements associated with endpoints 222, implement security and other configurations associated with endpoints 222, etc.

In an ACI environment, logical groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a web EPG can provide a service that a client EPG consumes, and that consumption can be subject to a filter (ACL) and a service graph that includes one or more services, such as firewall inspection services and server load balancing.

The example networks, architectures, and environments shown in FIGS. 1A-2B can be used to implement a remote cluster computing system. A remote cluster computing system includes remote virtual machines that can be used to host applications and services. More specifically, a remote cluster computing system can be used to execute jobs, including running loads using one or more applications, at clusters of virtualized machines in the remote cluster computing system. A remote cluster computing system can be provided by a third party cloud service provider, such as Amazon®, Rackspace®, and Microsoft®. For example, a user can provide a load and one or more applications as part of a job to a third party cloud service provider, who can subsequently execute the job using clusters of virtualized machines in a remote cluster computing system.

A remote cluster computing system can perform a job using clusters of virtualized machines according to a cluster-computing framework. For example, a remote cluster computing system can perform a job using Apache Spark®. In using a cluster-computing framework to perform a job, a remote cluster computing system can receive data used to perform the job through the cluster-computing framework. For example, a remote cluster computing system can receive a load and one or more applications to perform a job through an Apache Spark® interface. Additionally, in using a cluster-computing framework to perform a job, a remote cluster computing system can control programming of a cluster of virtualized machines and operation of the virtualized machines in executing one or more applications with a load to perform a job in the system. For example, a remote cluster computing system can receive an Apache Spark® Core including a production load for use in configuring and controlling running of the production load on one or more virtualized machines.

Further, a remote cluster computing system can be implemented on the example networks, environments, and architectures shown in FIGS. 1A-2B as both a cluster manager and a distributed storage system. Specifically, a cluster manager of a remote cluster computing system can set up and control operation of clusters of virtualized machines in the networks, environments, and architectures shown in FIGS. 1A-2B. Further, a distributed storage system implemented on the networks, environments, and architectures shown in FIGS. 1A-2B can store output of a production load running on the clusters of virtualized machines, as controlled by the cluster manager as part of performing a job using the production load. Subsequently, results of running the production load on the clusters of virtualized machines can be provided to a user as part of completing the job using the production load.

A remote cluster computing system can be configured to run a production load of a job on clusters of virtualized machines according to input, e.g. job input, received from a user requesting the job. More specifically, a remote cluster computing system can set up and control clusters of virtualized computers according to cluster configurations received from a user. For example, a remote cluster computing system can use input to set up clusters of virtual machines according to one or a combination of hardware parameters of the nodes/virtual machines to form a cluster, a number of nodes to form a cluster of nodes, and resource allocation of the one or more nodes to form a cluster according to the input.

Typical remote cluster computing systems charge for performing outsourced jobs. Specifically, costs of using the different types of virtual machine instances vary based on the instance type and the number of virtual machine instances used. Accordingly, a cost of outsourcing a job in the cloud is a function of both a number of virtual machine instances used and types of virtual machine instances used, e.g. as part of a cluster configuration.

Currently, users can choose virtual machine types by arbitrarily selecting machine types or by using previous experiences of outsourcing similar jobs to the cloud. This is problematic because users might define cluster configurations unsuitable for performing a specific job. For example, a user might select more expensive virtual machine instance types to perform a job while less expensive virtual machine instance types could have just as effectively performed the job. There therefore exists a need for systems and methods for automating cluster configuration selection for outsourced jobs in order to minimize usage costs.

Another area of concern for users outsourcing jobs to the cloud is ensuring that the jobs are completed within a specific amount of time, e.g. the service level objective deadline is satisfied. In order to ensure service level objective deadlines are met, users typically scale out by adding virtual machine instances to a cluster. This is often done irrespective of the actual cost to scaling out and whether the scaling out is actually needed to perform the job by the service level objective deadline. There, therefore exits a need for systems and methods for automating cluster configuration selection for jobs outsourced to the cloud in order to minimize usage costs while ensuring the service level objectives for the jobs are still met, e.g. a cost-optimal cluster configuration, otherwise referred to as an optimal cluster configuration.

Figure 3:
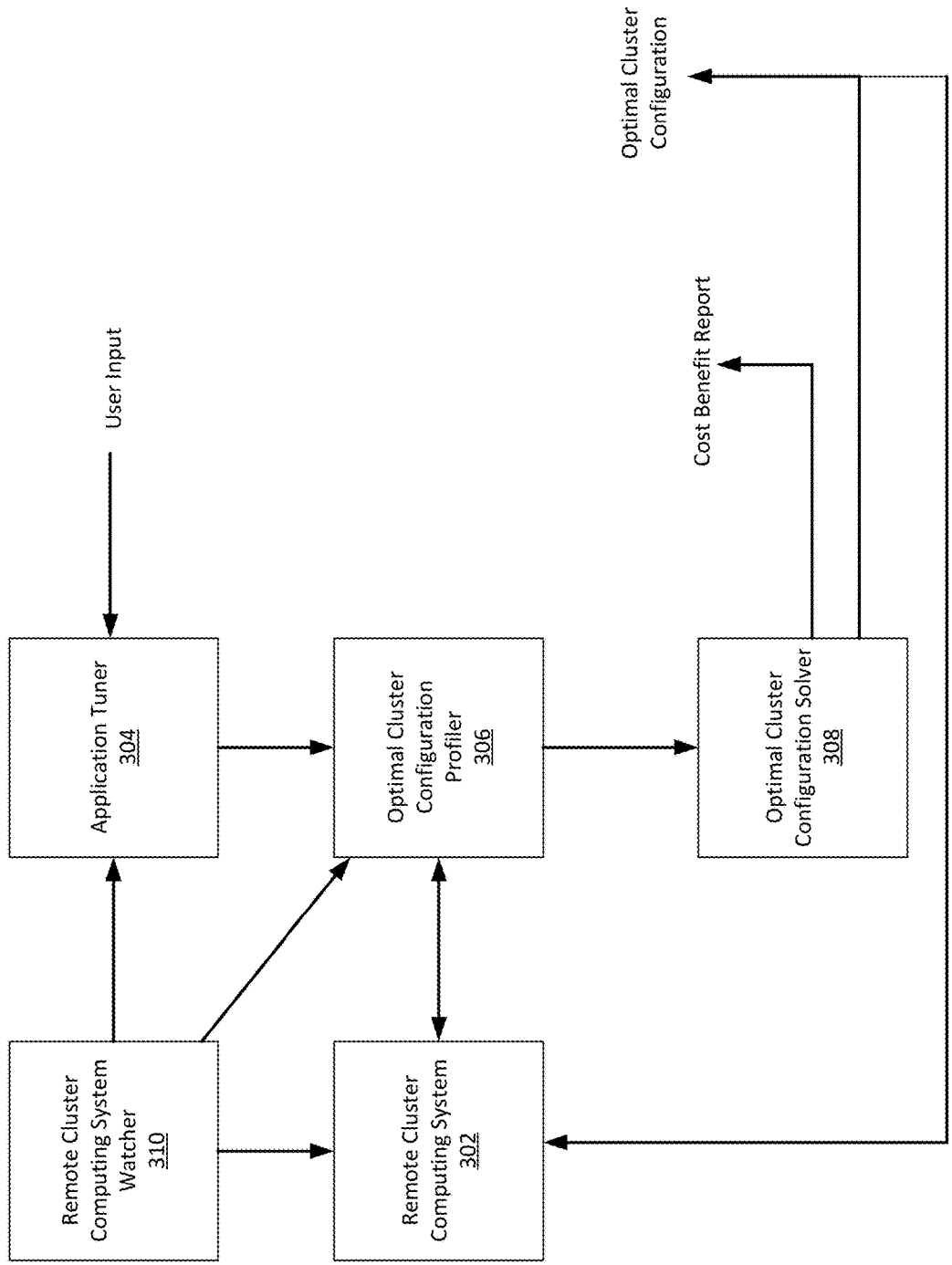
FIG. 3 illustrates an optimal cluster configuration identification system 300.

FIG. 3 illustrates an optimal cluster configuration identification system 300. The optimal cluster configuration identification system 300 functions to determine an optimal cluster configuration for a job outsourced to a remote cluster computing system 302. More specifically, the optimal cluster configuration identification system 300 can identify one or a combination of hardware parameters of the nodes/virtual machines to form one or more clusters of nodes for performing a job in the remote cluster computing system 302, a number of nodes to form one or more clusters of nodes for performing the job in the remote cluster computing system 302, and resource allocation of the one or more nodes to form the one or more clusters of nodes for performing the job in the remote cluster computing system 302. For example, the optimal cluster configuration identification system 300 can determine that one hundred clusters of nodes with ten nodes in each cluster is an optimal configuration for performing a job in the remote cluster computing system 302.

The example optimal cluster configuration identification system 300 shown in FIG. 3 includes an application tuner 304, an optimal cluster configuration profiler 306, an optimal cluster configuration solver 308, and a remote cluster computing system watcher 310.

The application tuner 304 functions to generate an application recommendation vector for a given job. An application recommendation vector includes values of parameters of a remote cluster computing system for executing a job. More specifically, an application recommendation vector includes values of parameters of a remote cluster computing system that are independent of clusters configurations for running one or more applications as part of performing a job in the remote cluster computing system. For example, an application recommendation vector can include values for a spark.searializer parameter of running one or more applications in a remote cluster computing system.

A job can subsequently be run in the remote cluster computing system 302 using an application recommendation vector identified by the application tuner. Specifically, the remote cluster computing system 302 can be configured to run a job according to values of parameters, as indicated by an application recommendation vector created for the job. For example, a job can be run as a Spark® job at the remote cluster computing system 302 with spark.shuffle.manager configured according to an application recommendation vector selected by the application tuner 304 for the job.

The application tuner 304 can receive user input for a job to be outsourced to the remote cluster computing system 302. User input can include one or a combination of one or more applications to run in performing a job in the remote cluster computing system 302, all or a portion of a production load to run in performing the job in the remote cluster computing system 302, and user defined parameters for performing the job, e.g. a service level objective deadline. Additionally, user input can be in a format for use by an applicable cluster-computing framework. For example, user input can be an Apache Spark® jar file.

Further, the application tuner 304 can identify one or more values of parameters of a remote cluster computing system based on input received from a user. More specifically, the application tuner 304 can create an application recommendation vector using input received from a user. For example, the application tuner 304 can use one or more applications for a job provided by a user to generate an application recommendation vector for the job.

The application tuner 304 can generate an application recommendation vector from a pre-selected subset of configurable parameters of a plurality of configurable parameters for the remote cluster computing system 302. For example, an Apache Spark® based cluster computing system can have 150 tunable parameters, and the application tuner 304 can only use 12 pre-selected parameters of the 150 tunable parameters to generate an application recommendation vector. In turn, this reduces the amount of computational resources utilized to generate the application recommendation vector, by reducing the number of possible parameter combinations. Parameters of a plurality of parameters pre-selected for use in generating application recommendation vectors can be pre-selected through parametric pruning. More specifically, the pre-selected parameters can be the parameters of a plurality of parameters that most greatly impact performance of a job in the remote cluster computing system 302. For example, the pre-selected parameters can be the parameters that lead to faster or slower job completion times in the remote cluster computing system 302.

The application tuner 304 can use a knowledge-based decision tree to generate an application recommendation vector for a given job. A knowledge-based decision tree includes different values of parameters of the remote cluster computing system 302 organized in a tree like hierarchy based on impact on performing jobs in the remote cluster computing system 302. For example, a knowledge-based decision tree can include a first value of a first parameter and values of a second parameter underneath the first value of the first parameter based on how the combinations of the values of the second parameter and the first value of the first parameter affect overall performance. In using a knowledge-based decision tree to generate an application recommendation vector, the application tuner 304 can run through different branches of the tree to identify a combination of values of parameters of the remote cluster computing system 302 that will beneficially affect performance, e.g. increase a speed of running a job in the remote cluster computing system 302. A knowledge-based decision tree can be generated by running different applications in the remote cluster computing system 302. For example, user input can include one or more applications to run when performing a job and the one or more applications can be run in the remote cluster computing system 302 separately from actually performing the job, in order to generate or update a knowledge-based decision tree.

The optimal cluster configuration profiler 306 functions to identify expected completion times for a job to be performed in the remote cluster computing system 302. Expected completion times identified by the optimal cluster configuration profiler 306, as will be discussed in greater detail later, can subsequently be used to identify an optimal cluster configuration. For example, expected completion times identified by the optimal cluster configuration profiler 306 can be used to ensure a job will be completed by a service level objective deadline in the remote cluster computing system 302. The optimal cluster configuration profiler 306 can identify expected completion times for a job to be performed in the remote cluster computing system 302 for different cluster configurations in the remote cluster computing system 302. More specifically, the optimal cluster configuration profiler 306 can identify expected completion times for one or a combination of different hardware parameters of one or more nodes to form the different cluster configurations, different numbers of nodes of the one or more nodes to form different cluster configurations, and different resource allocations of the of one or more the nodes to form the different cluster configurations.

In identifying expected completion times for different cluster configurations, the optimal cluster configuration profiler 306 can instantiate different cluster configurations in the remote cluster computing system 302. More specifically, the optimal cluster configuration profiler 306 can instantiate different cluster configurations by varying one or a combination of a number of nodes to form one or more clusters of nodes for performing the job in the remote cluster computing system 302, and resource allocation of the one or more nodes to form the one or more clusters of nodes for performing the job in the remote cluster computing system 302, and hardware parameters of the nodes/virtual machines to form one or more clusters of nodes for performing a job in the remote cluster computing system 302. For example, the optimal cluster configuration profiler 306 can vary configurations of virtual machines, e.g. allocation of cores distributed task dispatching, task scheduling, basic I/O functionalities, and memory to Spark driver and executors, in order to instantiate different cluster configurations in the remote cluster computing system 302.

The optimal cluster configuration profiler 306 can subsequently run a sample of a production load, e.g. received as part of user input, on the different cluster configurations instantiated in the remote cluster computing system. A sample of a production load includes only a portion of the production load, e.g. 1-10% of the actual production load. Results of running a sample of a production load on different cluster configurations can be used by the optimal cluster configuration profiler 306 to identify expected completion times of the production load on the various cluster configurations in the remote cluster computing system 302. For example, a production load can be run on clusters of between two to five instantiated virtual machines to determine expected completion times for a job at different cluster configurations in the remote cluster computing system 302.

The optimal cluster configuration profiler 306 can run a production load across different cluster configurations using one or more applications provided as part of user input for a job. More specifically, the optimal cluster configuration profiler 306 can set up one or more applications on different cluster configurations, and the remote cluster computing system 302 can run a sample load across the different cluster configurations using the one or more applications. The optimal cluster configuration profiler 306 can set up one or more applications on different cluster configurations instantiated in the remote cluster computing system 302 using an application recommendation vector identified by the application tuner 304. For example, the optimal cluster configuration profiler 306 can set up an application to execute at different cluster configurations as a Spark® job in the remote cluster computing system 302 with spark.shuffle.compress enabled.

A number of nodes instantiated in the remote cluster computing system 302 and used to forecast expected completion times for a job by the optimal cluster configuration profiler 306 can be less than a production level number of nodes in the remote cluster computing system 302. More specifically, either or both a number of virtualized machines in a cluster of virtual machines and a number of clusters of virtualized machines used to identify expected completion times of a job can be less than either or both a production level number of virtualized machines in a cluster and a production level number of clusters of virtualized machines. A production level number of virtualized machines and a production level number of clusters of virtualized machines can be the actual number of virtualized machines and clusters of virtualized machines used to complete a production level load in the remote cluster computing system 302. Using less than a production level number of nodes in the remote cluster computing system 302 to determine expected completion times of a job reduces computational resources of the remote cluster computing system 302 used to identify the expected completion times. In turn, this reduces costs, e.g. costs to rent the nodes in the remote cluster computing system 302, of actually determining expected completion times and optimal cluster configurations.

The optimal cluster configuration profiler 306 can use one or more multi-linear regression models to determine expected completion times of a job across different cluster configurations. A multi-linear regression model can indicate completion times of a job as a function of load on the different cluster configurations for the job. Additionally, a multi-linear regression model can be specific to a cluster configuration. For example, a multi-linear regression model can specify expected completion times for a varying load on a four node cluster configuration.

The optimal cluster configuration profiler 306 can train one or more multi-linear regression models used to identify expected completion times of a job. More specifically, the optimal cluster configuration profiler 306 can train one or more multilinear regression models based on output of running a sample load or a replicated load on different cluster configurations instantiated in the remote cluster computing system 302. For example, the optimal cluster configuration profiler 306 can use a completion time of running a sample load on an instantiated cluster configuration to estimate a completion time for running a production load on the cluster configurations. Further in the example, the optimal cluster configuration profiler 306 can use a completion time of running the sample load on the instantiated cluster configuration to estimate a completion time for running the production load on a production node level. Accordingly, completion times for a job at a production level load on a production level number of nodes/cluster configuration can be forecasted using a model trained by running a sample load or a replicated load on a number of nodes less than a production level number of nodes.

The optimal cluster configuration solver 308 functions to identify an optimal cluster configuration for a specific job. An optimal cluster configuration can specify one or a combination of a number of nodes to form one or more clusters of nodes for performing the job in the remote cluster computing system 302, and resource allocation of the one or more nodes to form the one or more clusters of nodes for performing the job in the remote cluster computing system 302, and hardware parameters of nodes to form one or more clusters of nodes for performing a job in the remote cluster computing system 302. For example, an optimal cluster configuration can specify a type of machine to virtualize in a cluster of nodes in the remote cluster computing system 302 for performing a job in the remote cluster computing system 302.

The optimal cluster configuration solver 308 can use forecasted completion times of a job, as identified by the optimal cluster configuration profiler 306, to identify an optimal cluster configuration for the job. Additionally, the optimal cluster configuration solver 308 can utilize input indicating a service level objective deadline for a job to determine an optimal cluster configuration for the job. For example, if a first cluster configuration is forecast to complete a job before a deadline and a second cluster configuration is forecast to complete the job after the deadline, then the optimal cluster configuration solver 308 can identify the first cluster configuration as an optimal cluster configuration for the job.

Additionally, the optimal cluster configuration solver 308 can select an optimal cluster configuration, e.g. cost-optimal cluster configuration, based on costs associated with the remote cluster computing system 302. More specifically, the optimal cluster configuration solver 308 can select an optimal cluster configuration from a plurality of cluster configurations based on costs of using the cluster configurations to perform a job. For example, the optimal cluster configuration solver 308 can select a cheapest cluster configuration for performing a job as an optimal cluster configuration for the job. Further, the optimal cluster configuration solver 308 can select an optimal cluster configuration based on costs associated with a remote cluster computing system and a service level objective deadline for a job. For example, a first cluster configuration can complete a job faster than a second cluster configuration while both cluster configurations still complete the job by the service level objective deadline. Further in the example, the first cluster configuration can be more expensive than the second cluster configuration. As a result, the optimal cluster configuration solver 308 can select the second cluster configuration as an optimal cluster configuration as it is cheaper and still completes the job by the deadline.

In identifying an optimal cluster configuration, users no longer need to arbitrarily select cluster configurations for jobs outsourced to a remote computing system. As a result, a completely uninformed user can still configure a remote computing system to perform a job. Additionally, even if a user is knowledgeable about remote computing systems, a better cost-optimal cluster configuration can provide the user with a cheaper cluster configuration for completing a job while still performing the job by a deadline, thereby saving the user money.

Additionally, the optimal cluster configuration solver 308 can present one or more identified optimal cluster configurations to a user. Subsequently, the user can select an optimal cluster configuration. In response to selecting an optimal cluster configuration, the remote cluster computing system 302 can be configured or reconfigured, potentially by the optimal cluster configuration identification system 300, to perform a job using the selected optimal cluster configuration.

The optimal cluster configuration solver 308 can determine one or more optimal cluster configurations for a job as the job is being performed in the remote cluster computing system using a current cluster configuration. Specifically, the optimal cluster configuration solver 308 can compare an optimal cluster configuration with a current cluster configuration. For example, the optimal cluster configuration solver 308 can compare costs of renting space in a remote cluster computing system 302 for an optimal cluster configuration and a current cluster configuration. Further, the optimal cluster configuration solver 308 can prepare and present to a user a cost benefit report comparing a cost of a current cluster configuration with costs of one or more identified optimal cluster configurations. Subsequently, the user can select an optimal cluster configuration using the cost benefit report.

The remote cluster computing system watcher 310 functions to observe a job being performed in the remote cluster computing system 302. In observing a job performed in the remote cluster computing system 302, the remote cluster computing system watcher 310 can gather or otherwise generate telemetry data for the job. Telemetry data for a job under performance includes performance data related to performance of the job in the remote cluster computing system 302. For example, telemetry data for a job under performance can include detected abnormalities occurring during a job, bottlenecks, e.g. points in a job where a job is slowed a specific amount, completion times of portions of a job, characteristics of virtualized machines used to perform a job, interactions between different virtualized machines used to perform a job, alerts of abnormalities, alerts triggering recalibration of an optimal cluster configuration, and suggestions for recalibrating an optimal cluster configuration. The remote cluster computing system watcher 310 can gather and generate telemetry data for a job running under an optimal cluster configuration, as identified by the optimal cluster configuration solver 308. Additionally, the remote cluster computing system watcher 310 can gather and generate telemetry data for a job running under a non-optimal cluster configuration, e.g. a configuration that was not identified by the optimal cluster configuration solver 308.

Telemetry data can be provided from the remote cluster computing system watcher 310 to the application tuner 304. Subsequently, the application tuner 304 can use telemetry data for a current job to generate or modify an application recommendation vector for the job. For example, if telemetry data indicates a bottleneck occurred during a job, then the application tuner can modify or generate an application recommendation vector for the job to attempt to minimize occurrences of bottlenecks during the course of the job. Subsequently, a modified or new application recommendation vector created for a job using telemetry data can be implemented at the remote cluster computing system 302 to control continued performance of the job.

Additionally, telemetry data can also be used by the application tuner 304 to generate application recommendation vectors for future jobs. For example, the application tuner 304 can use telemetry data for a job to generate or update a knowledge-based decision tree. Further in the example, the application tuner can use the knowledge-based decision tree to generate application recommendation vectors for future jobs.

Telemetry data can be provided from the remote cluster computing system watcher 310 to the optimal cluster configuration profiler 306. The optimal cluster configuration profiler 306 can use received telemetry data to further train multi-linear regression models used to predict completion times of a job. For example, the optimal cluster configuration profiler 306 can update a model based on actual completion times observed for a job, as included as part of telemetry data. The optimal cluster configuration profiler 306 can subsequently use updated models to calculate new expected completion times of a job. The new expected completion times can then be used by the optimal cluster configuration solver 308 to calculate, potentially new, optimal cluster configurations. For example, if a job is being completed faster than expected on a current optimal cluster configuration, as indicated by telemetry data, then the optimal cluster configuration solver 308 can identify a new optimal cluster configuration that slows down the job and reduces costs in performing the job.

Figure 4:
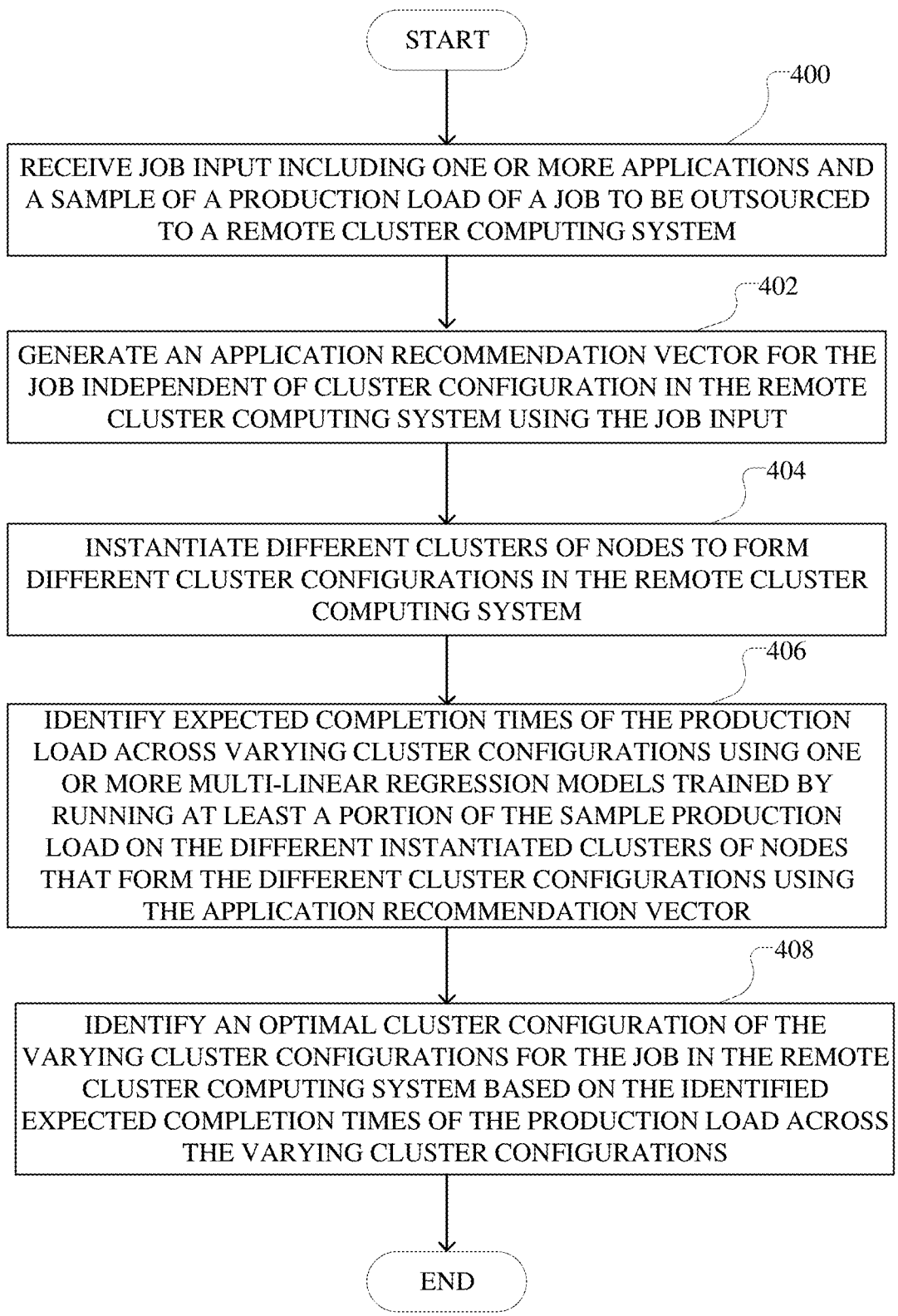
FIG. 4 illustrates a flowchart for an example method of identifying an optimal cluster configuration for a job in a remote cluster computing system.

FIG. 4 illustrates a flowchart for an example method of identifying an optimal cluster configuration for a job in a remote cluster computing system. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Each module shown in FIG. 4 represents one or more steps, processes, methods or routines in the method. For the sake of clarity and explanation purposes, the modules in FIG. 4 are described with reference to the optimal cluster configuration identification system 300 shown in FIG. 3.

At step 400, the application tuner 304 receives job input including one or more applications and a sample of a production load of a job to be outsourced to a remote cluster computing system. The one or more applications can be used to run the production load at the remote computing system. Job input received by the application tuner can also specify a service level objective deadline for completing the job in the remote computing system.

At step 402, the application tuner 304 generates an application recommendation vector for the job using the job input. An application recommendation vector can be generated at step 402 independent of clusters configurations in the remote cluster computing system. More specifically, value of parameters of performing the job in the remote cluster computing system independent of cluster configurations can be selected for the job. The application recommendation vector can be generated for the job using a knowledge-based decision tree, potentially created by running the one or more applications one or a plurality of times in the remote cluster computing system.

At step 404, the optimal cluster configuration profiler 306 instantiates different clusters of nodes to form different cluster configurations in the remote cluster computing system. Different clusters of nodes can be instantiated to form different cluster configurations by varying one or a combination of hardware parameters of the nodes/virtual machines to form one or more clusters of nodes for performing a job in a remote cluster computing system, a number of nodes to form one or more clusters of nodes for performing the job in the remote cluster computing system, and resource allocation of the one or more nodes to form the one or more clusters of nodes for performing the job in the remote cluster computing system. For example, different cluster configurations can be instantiated by instantiating node clusters with three and four virtualized machines.

At step 406, the optimal cluster configuration profile 306 identifies expected completion times of the production load across varying cluster configurations using one or multi-linear regression models. Multi-Linear regression models used to identify expected completion times of the production load can be trained by running the sample production load on the instantiated clusters of nodes that form the different cluster configurations. More specifically, the multi-linear regression models can be trained by running the sample production load according to the application recommendation vector on the instantiated clusters of nodes that form the different cluster configurations. In various embodiments, a number of nodes instantiated to form each cluster configuration of the different cluster configurations can be less than a production level number of nodes used to run the production load in the remote cluster computing system.

At step 408, the optimal cluster configuration solver 308 identifies an optimal cluster configuration of the varying cluster configurations for the job in the remote cluster computing system based on the identified expected completion times of the production load across the varying cluster configurations. An optimal cluster configuration can be identified using the expected completion times across the varying cluster configurations based on a service level objective deadline of the job. Additionally, an optimal cluster configuration can be identified using the expected completion times across the varying cluster configurations based on costs to implement or otherwise utilize the varying cluster configurations in the remote cluster computing system.

Figure 5:
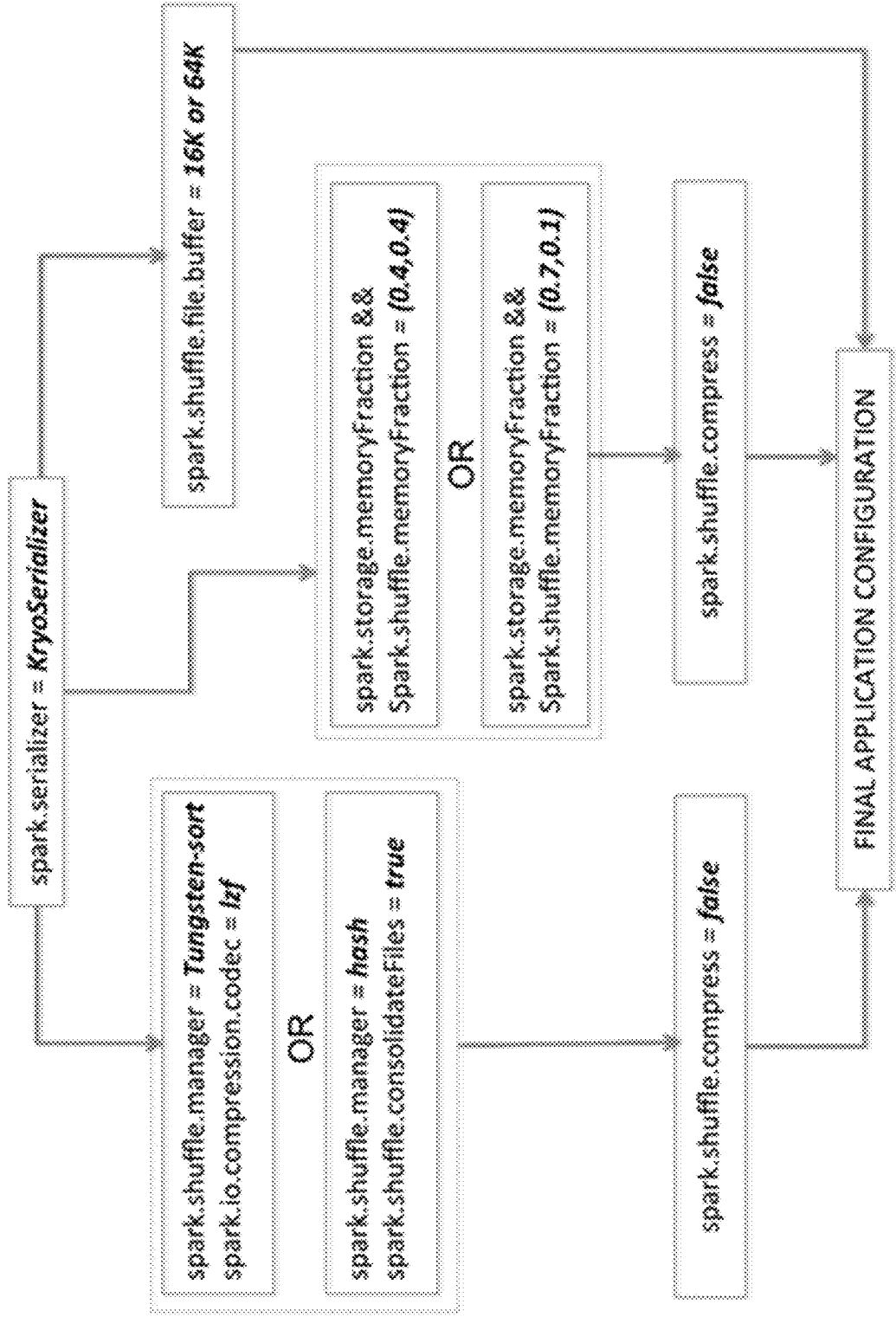
FIG. 5 depicts an example heuristic for identifying an application recommendation vector for one or more applications for a job outsourced to a remote cluster computing system.

FIG. 5 depicts an example heuristic 500 for identifying an application recommendation vector for one or more applications for a job outsourced to a remote cluster computing system. The example heuristic 500 can be used to identify an application vector for a job as part of identifying an optimal cluster configuration for the job in a remote cluster computing system. More specifically, the heuristic 500 can be implemented or otherwise used by the application tuner 304 to identify an application recommendation vector, e.g. as part of a knowledge-based decision tree. While the heuristic 500 shown in FIG. 5 is specific to Spark® cluster computing systems, in various embodiments, different heuristics specific to other cluster computing frameworks can be used by the application tuner 304 to generate an application recommendation vector.

The heuristic 500 only includes up to 9 of a total 150 tunable parameters of Spark®. This greatly reduces an amount of computational resources used in identifying application recommendation vectors. Specifically, assuming that each tunable Spark® parameter only has two distinct values, a minimum total of 2 or 512 runs for the possible combinations of tunable parameters would need to be performed if every parameter was considered in generating an application recommendation vector. This is an inefficient use of resources as a majority of the tunable parameters fail to impact job speed in Spark® remote cluster computing systems. Therefore, the specific tunable parameters in the heuristic 500, as will be discussed in greater detail later, were chosen for having the greatest impact on performance of a job in a Spark® remote cluster computing system. Additionally, the specific tunable parameters in the heuristic 500 are independent of cluster configurations in a remote cluster computing system.

In using the heuristic 500 to identify an application recommendation vector for an application as part of an outsourced job, the application can be run one or more times according to varying parameters in the heuristic. More specifically, runs can start from the top and, if an individual configuration improves the performance, the configuration is kept and can be passed to its children replacing the default value for the test runs on the same path branch. Alternatively, if an individual configuration fails to improve the performance, then the configuration is not added and the default is kept. In other words, each parameter configuration can be propagated downstream up to the final configuration as long as it yields performance improvements.

In various embodiments, configurations can be kept if they improve performance beyond a threshold amount. For example, configurations can be kept if they improve performance beyond a threshold amount, e.g. greater than 5% or 10% performance improvement. Performance improvement includes improvements to applicable aspects of executing an application in a remote cluster computing system as part of a job. For example, performance can include one or a combination of speed of execution of an application at a specific load, an ability to actually execute an application at a specific load, and not utilizing all memory without having the option to spill data on the disk and avoiding a crash of an application.

The first variable Spark® parameter checked in following the heuristic 500 is the spark.serializer parameter. The spark.serializer parameter can have the highest impact on performance. More specifically, the KryoSerializer can serve as the default baseline for all other parameters in the heuristic 500.

Next, one or a combination of the spark.shuffle.manager parameter, the spark.storage/shuffle.memoryFraction parameter, and the spark.shuffle.file.buffer are checked as part of running through the heuristic 500. These parameters can be checked in series or in parallel. More specifically, these parameters can be checked by varying the parameters either in series or in parallel during one or more test runs of an application.

The spark.shuffle.manager parameter can have a high impact on performance. Specifically, tungsten-sort can works better with the lzf compression codec, we combine the test of these two settings. Also, the test run for the other option of this parameter, the hash shuffling manager, can be conducted in combination with the implementation of consolidating files during a shuffle, to avoid problems from the creation of too many intermediate files.

The spark.storage/shuffle.memoryFraction parameters are inherently important in Spark, due to its main memory-oriented execution model. These parameters can be varied to control how much memory is immune to eviction. Additionally, these parameters can be varied to set an amount of memory can be used for shuffles.

The spark.shuffle.file.buffer parameter has a smaller impact on performance but still does impact performance. This parameter can be varied to control a size of an in-memory buffer for each shuffle file output stream. In various embodiments, when an application is only run one or two times using the heuristic 500, this parameter can be omitted.

The spark.shuffle.spill.compress parameter appears to not have any significant impact on performance, however it is closely linked to the shuffling memory fraction. The spark.shuffle.spill.compress parameter is used to control whether compress data spilled during shuffles. Since the shuffling memory fraction is accounted for in the heuristic 500, the spark.shuffle.spill.compress parameter can also be included in the heuristic 500.

Disabling spark.shuffle.compress can lead to performance degradation (by default it is enabled). Accordingly this parameter has an impact on performance and is therefore included in the heuristic 500. It is noted, the best results presented by Spark's developers for the terasort benchmark are produced when this parameter is disabled, which further supports including the parameter in the heuristic 500.

TABLE 1

|  | Sort-by-key | Shuffling | K-Means | Average |
| --- | --- | --- | --- | --- |
| spark.serializer | 26.6% | 9.2% | <5% | 12.6% |
| shuffle/storage.memoryFraction | 13.1% | 11.9% | 8.3% | 11.3% |
| spark.reducer.maxSizeInFlight | 5.5% | 5.7% | 11.5% | 7.5% |
| spark.shuffle.file.buffer | 6.3% | 11.6% | 6.9% | 8.2% |
| spark.shuffle.compress | 137.5% | 182% | <5% | 107.2% |
| spark.io.compress.codec | <5% | 18% | 6.1% | 8.9% |
| spark.shuffle.consolidateFiles | 13% | 11% | 7.7% | 10.5% |
| spark.rdd.compress | <5% | <5% | 5% | <5% |
| spark.shuffle.io.preferDirectBufs | 5.6% | 9.9% | <5% | 5.9% |
| spark.shuffle.spill.compress | <5% | 6.1% | <5% | <5% |

Table 1, shown above, illustrates average impacts on performance achieved across different load conditions. The impacts on performance shown in Table 1 include reductions in completion times of jobs in a remote cluster computing system. Table 1 shows that all of the previously mentioned parameters can have an impact on performance. Specifically, the spark.shuffle.compress parameter is shown to impact performance greatly when it is enabled as opposed to when it is disabled. Additionally, the spark.serializer parameter, spark.shuffle.consolidateFiles parameter, and the shuffle/storage.memoryFraction parameter also greatly affect performance of a job in a remote cluster computing system.

Figure 6:
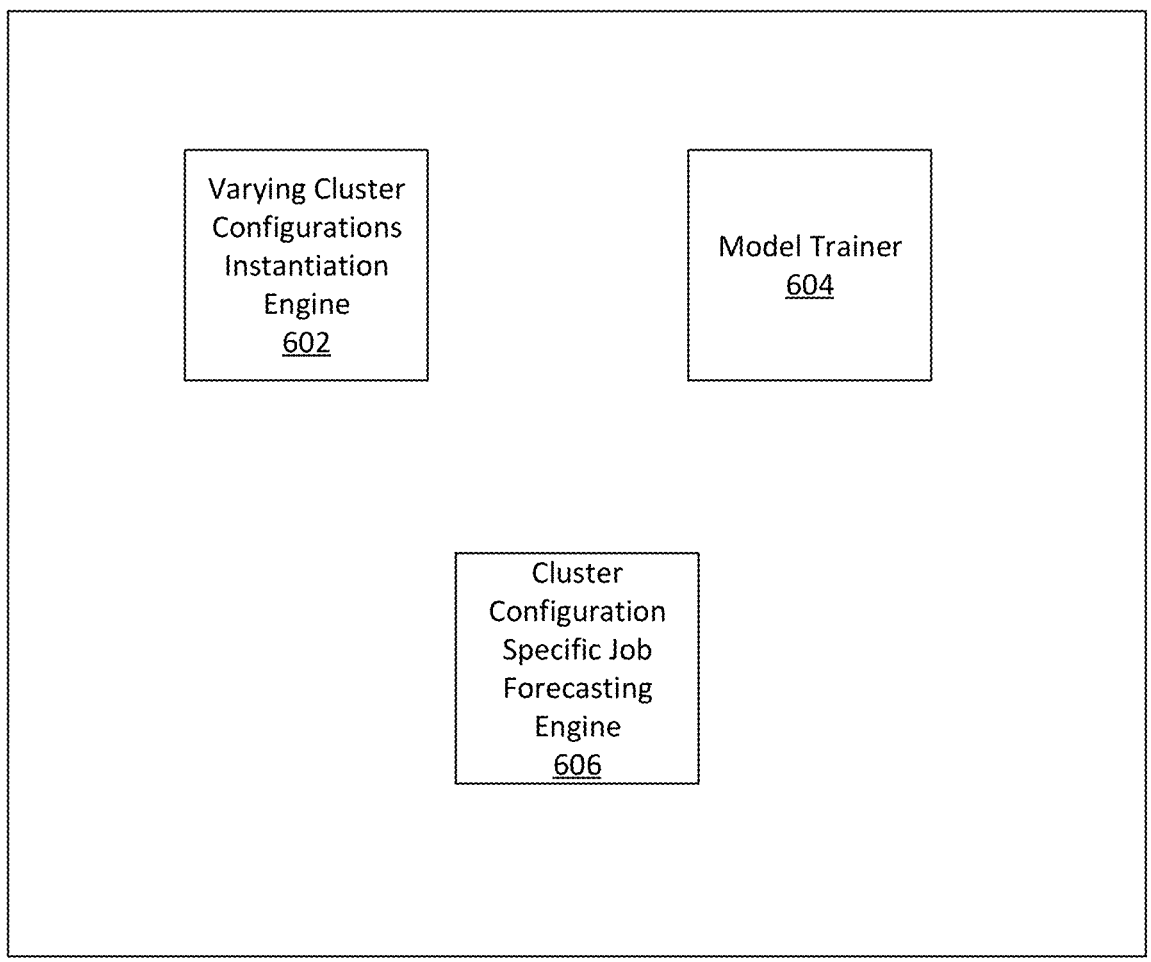
FIG. 6 is a diagram of an example optimal cluster configuration profiler.

FIG. 6 is a diagram of an example optimal cluster configuration profiler 600. The optimal cluster configuration profiler 600 shown in FIG. 6 can function according to an applicable profiler for estimating completion times of jobs across varying cluster configurations, such as the optimal cluster configuration profiler 306 shown in FIG. 3. In estimating completion times of jobs across varying cluster configurations, the optimal cluster configuration profiler 600 can instantiate different clusters to form different cluster configurations in a remote computing system. Further, optimal cluster configuration profiler 600 can run a sample load or a replicated load created from a sample load on the different instantiated cluster configuration to train one or more models. Subsequently, the optimal cluster configuration profiler 600 can use the one or more models to estimate completion times of a job across the varying cluster configurations, for purposes of determining an optimal cluster configuration for performing a job.

Developers have tried to develop systems for predicting performance in cluster computing system. One such system is the Ernest system. It is purported that Ernest can be accurately trained using very few data points and smaller loads compared to a production level load. However, if a job will run on an operation point (load and nodes) outside of a training region used to train Ernest, then Ernest suffers from errors in predicting behaviors of cluster configurations. For example, when Ernest is trained on a region of 1-10% of a target load run one between 1-5 nodes and subsequently used to estimate the completion time when using a target load of 200%, the relative errors were as high as ~150%.

Figure 7A:
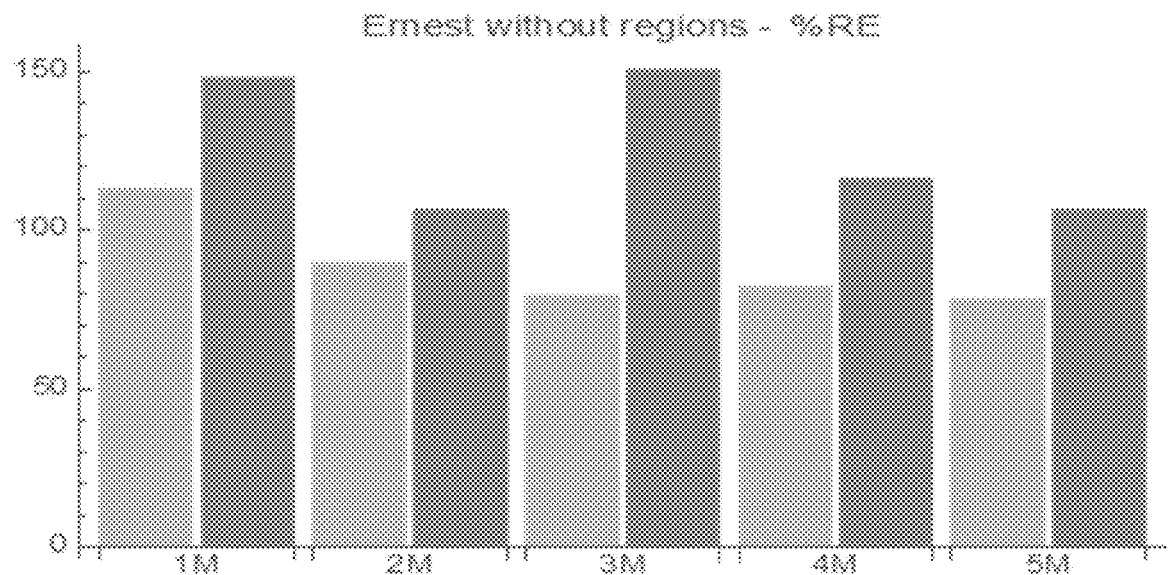
FIGS. 7A and 7B are charts showing residual errors observed in application of the Ernest system as a result of the previously described deficiencies of the Ernest system.
Figure 7B:
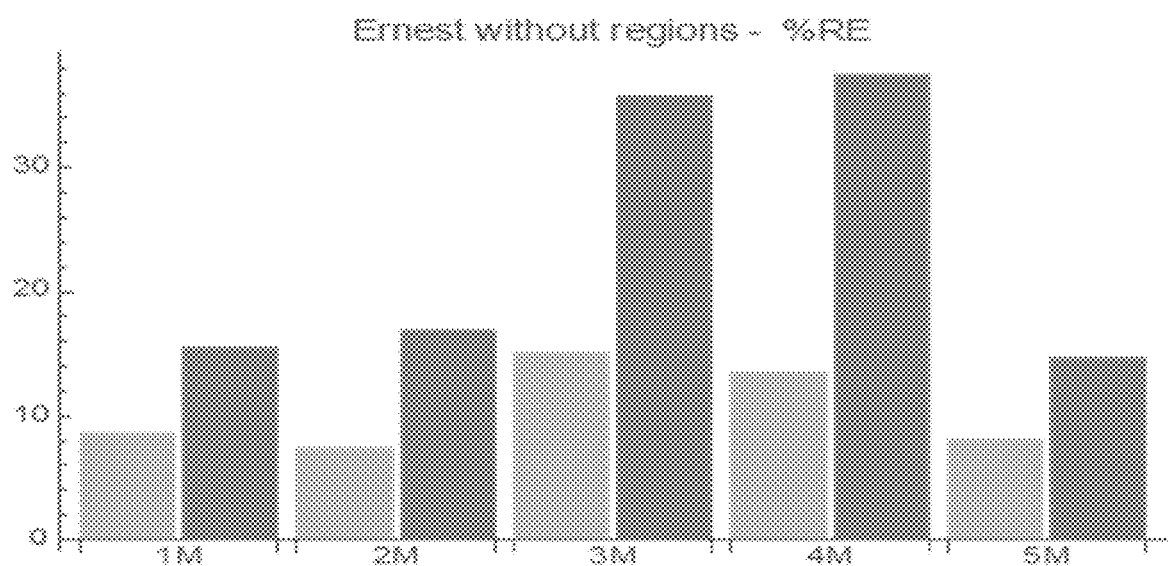

In particular, the Ernest system exhibits failures when Bottleneck conditions occur during running of a job in a remote cluster computer system. Bottleneck conditions happen regularly when the cluster computing system face pressure points. Example bottleneck conditions include inability to provision new demanded executors, high CPU and memory utilization, high disk read/write OPS, high network bandwidth utilization, high levels of garbage collection, etc. FIGS. 7A and 7B are charts showing residual errors observed in application of the Ernest system as a result of the previously described deficiencies of the Ernest system. FIG. 7A shows residual error for PageRank, while FIG. 7B shows residual error for alternating least squares (herein referred to as "ALS"). FIGS. 7A and 7B shows residual error as a function of a number of nodes in a cluster. Specifically, 1M corresponds to 2 nodes, 2M corresponds to 3 nodes, 3M corresponds to 4 nodes, 4M corresponds to 5 nodes, and 5M corresponds to 6 nodes. To generate the charts shown in FIGS. 7A and 7B, Ernest was trained with a sample production load range of 100-300 for the previously mentioned cluster configurations. Subsequently, Ernest was used to predict production loads of 600-1300. As shown in the charts, significant errors percentages were observed. Specifically, the average residual error for PageRank was 82% while the maximum residual error was 150%. Further, the average residual error for ALS was 12% while the maximum residual error was 70%.

Returning back to the example optimal cluster configuration profiler 600 shown in FIG. 6, the optimal cluster configuration profiler 600 includes a varying cluster configurations instantiation engine 602, a model trainer 604, and a cluster configuration specific job forecasting engine 606.

The varying cluster configuration instantiation engine 602 can instantiate varying cluster configurations in a remote cluster computing system. In instantiating varying cluster configurations in a remote cluster computing system, the varying cluster configuration instantiation engine 602 can set up different cluster configurations according to one or a combination of hardware parameters of nodes to form one or more clusters of nodes for performing a job in a remote cluster computing system, a number of nodes to form one or more clusters of nodes for performing a job in a remote cluster computing system, and resource allocation of the one or more nodes to form one or more clusters of nodes for performing a job in a remote cluster computing system 302. For example, the varying cluster configuration instantiation engine 602 can set up clusters of nodes with different numbers of nodes to form varying cluster configurations in a remote cluster computing system.

The model trainer 604 functions to train a model for purposes of identifying estimated completion times of a job in a remote cluster computing system across varying cluster configurations. The model trainer 604 can train a model by running either or both a sample load of a production load or a replicated load created from a sample load of a production load across the varying cluster configurations instantiated by the varying cluster configuration instantiation engine 602. Additionally, the model trainer 604 can train a model by running sample and replicated loads of a job on instantiated cluster configurations according to an application recommendation vector for the job.

In various embodiments, the model trainer 604 can train one or more multi-linear regression models for use by the optimal cluster configuration profiler to forecast estimated completion times of a job across varying cluster configurations. More specifically, the optimal cluster configuration profiler 600 builds on theoretical foundations of parallel computing. The optimal cluster configuration profiler 600 can model an estimated job completion time as a function of the offered load l and the number of nodes n in the cluster as a combination of three terms: 1) $\sigma(l)$ which captures the inherently sequential computations of the job on a 1-node configuration; 2) $\varphi(l)$ which models the parallel computations on a 1-node configuration, and 3) $\tau(l, n)$ which accounts for inter-node communications and other repeat computations which appear as we add more nodes in the cluster (n>1). It is noted that $\tau(l, n)$ can be a monotonically increasing function with the number of worker nodes n. Assuming a perfect division of load and tasks across the n worker nodes in the cluster, estimated completion time T for a given cluster configuration can be represented as Equation 1 shown below.

$$T(l, n) = \sigma(l) + \frac{\varphi(l)}{n} + \tau(l, n) \quad \text{Equation 1}$$

Note that for a 1-node cluster configuration, Equation 1 collapses to $\sigma(l)+\varphi(l)$ since $\tau(l, 1)=0$. An idealistic scale-out coefficient $\psi(l, n)$ can be defined as the ratio of the estimated job completion time on a n-node configuration $T(l, n)$ and a 1-node configuration $T(l, 1)$. Accordingly, the speed-up can be represented as Equation 2 shown below.

$$\psi(l, n) = \quad \text{Equation 2}$$
$$\frac{T(l, n)}{T(l, 1)} = \frac{\sigma(l) + \frac{\varphi(l)}{n} + \tau(l, n)}{\sigma(l) + \varphi(l)} = 1 + \frac{\varphi(l)\left(\frac{1}{n} - 1\right) + \tau(l, n)}{\sigma(l) + \varphi(l)}$$

The above equation states that at a given load l, adding active nodes to the cluster reduces the computation time but increases the communication time. At some point, the communication time increase can be larger than the parallel gain time resulting in an increase of the scale-out and hence in higher completion times. Usually the communication time $\tau(l, n)$ has lower complexity than the parallel computation time $$\varphi(l)/\left(\frac{1}{n} - 1\right)$$

which results in these three key observations which constitute the foundations of a multi-linear regression model used by the optimal cluster configuration profiler to estimate completion times for cluster configurations and are described as follows.

First, in normal (no bottlenecks) regions of low to medium loads, the communication time $\tau(l, n)$ tends to dominate the computation time $$\varphi(l)\left(\frac{1}{n} - 1\right)$$

as the number of nodes in a cluster is increased. This results in a positive second term in Equation 2 which leads to an increase in completion times. In turn, this leads to a gradual activation of nodes available in the cluster as the offered load increases.

Conversely, in normal regions of high loads, the term $$\varphi(l)\left(\frac{1}{n} - 1\right)$$

dominates the $\tau(l, n)$. As a result, the second term in Equation 2 can become negative leading to smaller completion times. In turn, this leads to a full utilization of available nodes in the cluster to take full advantage of the parallelism.

Third, when the cluster is operated in abnormal conditions (e.g., one or more bottlenecks are encountered), the completion time tends to spike up. For example, high Disk IO operations may cause long idle periods in CPU (executors cannot access the data) and hence unexpected waiting times; this manifests itself in low CPU utilization values as well as large increase in completion times; similarly, partitions which do get too large in size (for a constant number of partitions, the size of the partition increases as we increase the offered load), may cause executors failures if their allocated heap size cannot accommodate the entire partition size; moreover, in this case the affected executor has to be redeployed by the scheduler on another node increasing even further the completion time. Events like the above, usually translate into a spike of $\tau(l, n)$ (and hence completion times) which are random in magnitude and hard to properly predict. A model maintained by the optimal cluster configuration profiler 600 should predict the load or set of loads at which those problems can arise and preemptively add new resources to the cluster to distribute increasing loads across larger pool of resources.

An indicative function used in defining a model utilized by the optimal cluster configuration profiler can be defined as $I_{Ri}$ as 1 for loads $l \in [R_i]$ and 0 otherwise. $1_{R_{i-}}$ and $1_{R_{i+}}$ can represent two loads indicating the beginning and the ending of the load region $R_i$. A load region can be defined based on a variety in load and a number of nodes. Subsequently an estimated completion time $T(l,n)$ can be modeled as Equation 3 shown below.

$$T(l, n) = \theta_{R1} I_{R1} + \Sigma_{R_i} [\theta_{R_i,0}(n) + \theta_{R_i,S}(n)\, l] I_{R_i} \text{ with } R_i \geq 2, \quad \text{Equation 3}$$
$$n \geq 1$$

where $$\theta_{R_i,S}(n) = \theta_{R_i,S}(1)\left[1 + \beta_{1,R_i}\left(\frac{1}{n} - 1\right) + \beta_{2,R_i}\, \ln(n)\right] \text{ with } \beta_{1,R_i}, \quad \text{Equation 4}$$
$$\beta_{2,R_i} \geq 0, n \geq 1$$

Equation 3 states that estimated completion times are expected to be constant in R1 (a region of very low loads where no parallelization gain can be achieved) and follow a piece-wise linear function for offered loads forward. Equation 4 captures the relationship among the slopes of the linear functions as a function of the number of nodes n for each load region $R_i$. More specifically, Equation 4 derives the relationships among the different curves as a function of the number of nodes taking the cluster with one none (n=1) as the reference point. Under normal cluster conditions, Equation 3 can be expected to be continuous at the joints of adjacent load regions, i.e., $\theta_{R_i,0}(n)+\theta_{R_i,S}(n) \ 1_{R_{i_+}}=\theta_{R_{i+1},0}(n)+\theta_{R_{i+1},S}(n) \ 1_{R_{i+1_-}}$. Conversely, under abnormal cluster conditions, the $\theta_{R_{i+1},0}(n)+\theta_{R_{i+1},S}(n) \ 1_{R_{i+1_-}}>\theta_{R_i,0}(n)+\theta_{R_i,S}(n) \ 1_{R_{i_+}}$. The example optimal cluster configuration profiler 600 can use a linear regression model in each region $R_i$ to estimate the coefficients $\{\theta_{R_1}, \theta_{R_i,0}, \theta_{R_i,S}, \beta_{1,R_i}, \beta_{2,R_i}\}$ for both Equations 4 and 5 to form a multi-linear regression model.

Figure 8A:
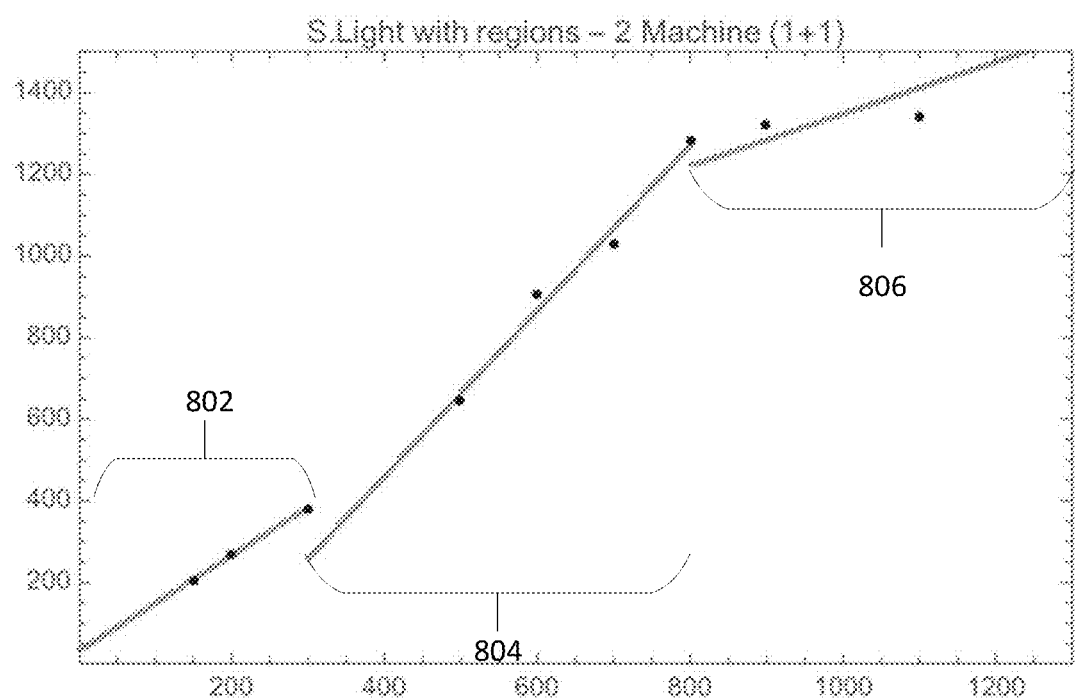
FIGS. 8A-C show multi-linear regression models across varying cluster configurations.
Figure 8B:
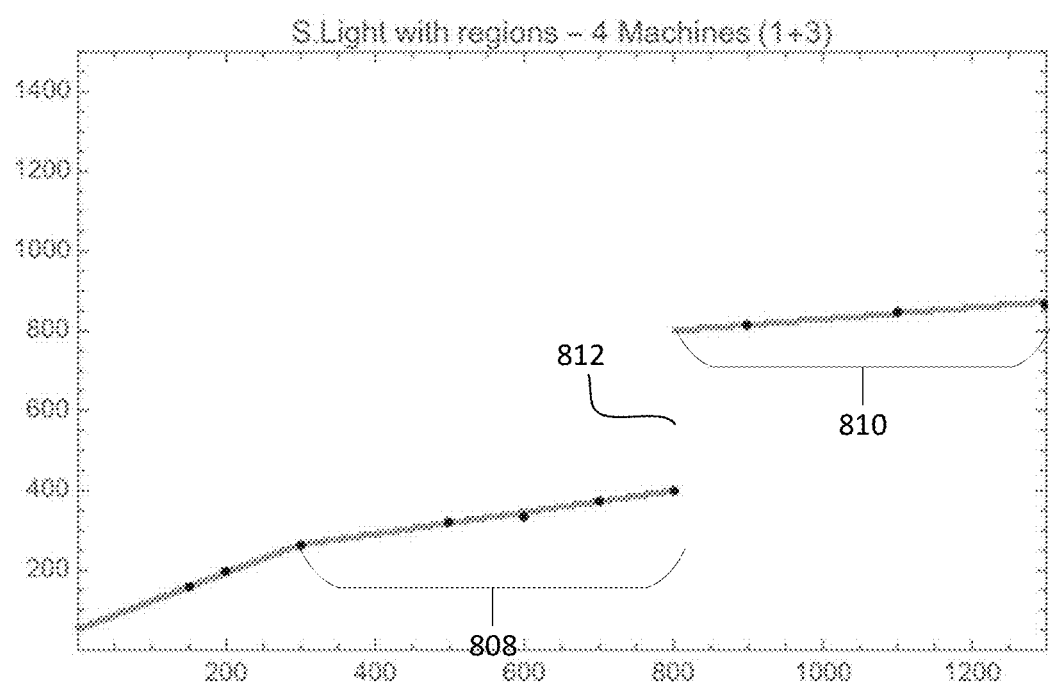
Figure 8C:
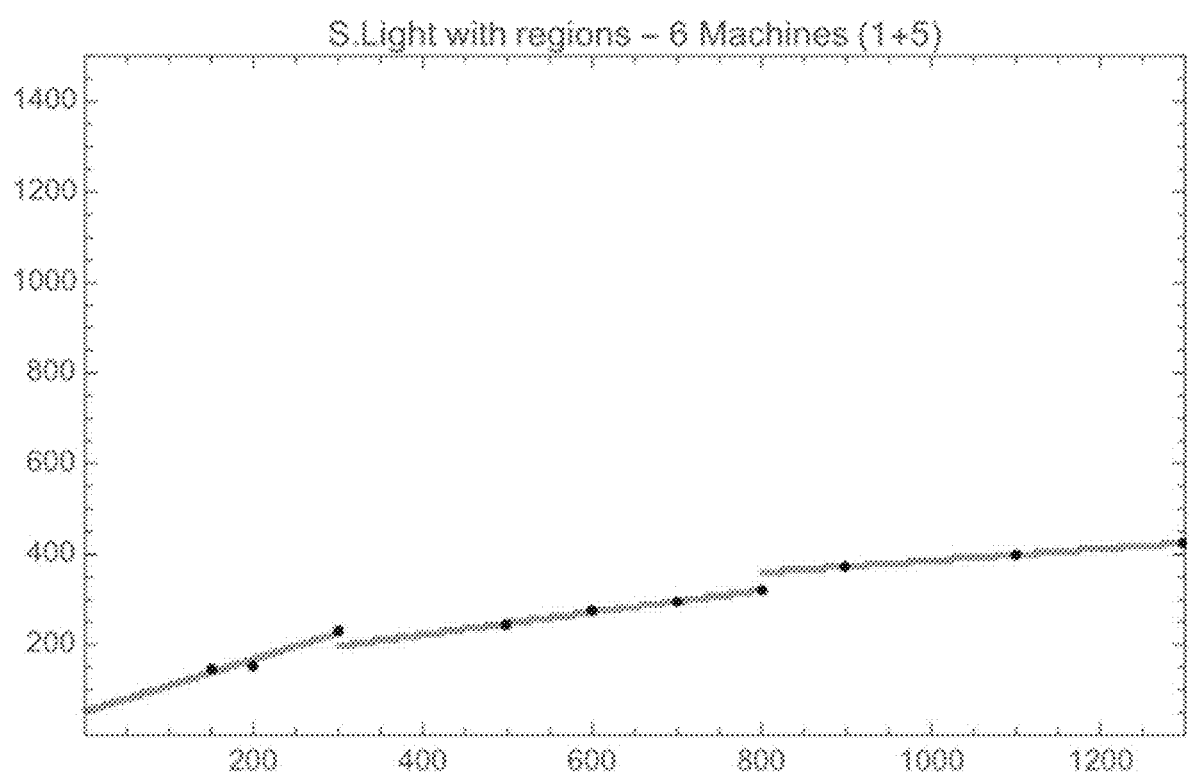

FIGS. 8A-C show multi-linear regression models, e.g. trained by the model trainer 604, across varying cluster configurations. More specifically, FIGS. 8A-C show estimated completion times as a function of loads across varying cluster configurations. FIG. 8A shows estimated completion times for load conditions ranging from 6 MB, a load of 60, to 15 GB, a load of 1300, on a 2 node, 1 master and 1 worker, cluster configuration. FIG. 8B shows estimated completion times for load conditions ranging from 6 MB, a load of 60, to 15 GB, a load of 1300, on a 4 node, 1 master and 3 workers, cluster configuration. FIG. 8C shows estimated completion times for load conditions ranging from 6 MB, a load of 60, to 15 GB, a load of 1300, on a 6 node, 1 master and 5 workers, cluster configuration. The models trained in FIGS. 8A-C are trained using ALS as the reference job.

The models include different load regions. Load regions correspond to different load amounts in different cluster configurations. Load regions are separated by and defined by large breaks or sudden jumps in estimated completion times in the overall model. For example, the model shown in FIG. 8A includes a first load region 802, a second load region 804, and a third load region 806. Similarly, the model shown in FIG. 8B includes a first load region 808 and a second load region 810 separated by a sudden jump in completion time 812 between the end of the first load region 808 and the beginning of the second load region 810. The large break or sudden jumps in estimated completion times used to segment the models into different load regions can correspond to bottleneck conditions occurring in the cluster configurations. For example, in the 4 node configuration shown in FIG. 8B, a 200% increase in completion time, occurring as a result of bottlenecks, is observed between an offered load of 800 and an offered load of 800.

If a piecewise linear model were used instead of the multi-linear regression models shown in FIGS. 8A-C, each model would be multiple straight lines at different slopes connected together to form a single line. This is problematic and can lead to the previously described error rates observed with the Ernest system. More specifically, as the Ernest system attempts to model a single line comprised of multiple segments having varying slopes, the slopes are partially determined based on connecting the different segments. This is problematic when large gaps between different load regions are observed. Specifically, Ernest does not take into account for different load regions as large gaps between different load regions distort the different segments and slopes of the segments used to form the single line. As a result, accuracy of the Ernest system in predicting completion times are significantly reduced.

As discussed previously the model trainer 604 can run sample loads, e.g. provided sample loads and replicated loads, on different cluster configurations instantiated by the varying cluster configurations instantiation engine 602. The cluster configuration specific job forecasting engine 606 can subsequently identify expected completion times of a job across varying cluster configurations. More specifically, the cluster configuration specific job forecasting engine 606 can identify expected completion times of the job across the varying cluster configurations based on results of running the sample loads on the different cluster configurations instantiated by the varying cluster configurations instantiation engine 602. In particular, the model trainer 604 and the cluster configuration specific job forecasting engine 606 can profile the job, as part of identifying estimated completion times of the job, using a few samples of the input data set (1%, 5%, 10% of production load) and subsequently forecast expected completion times for production load levels (100% load value).

In various embodiments, the model trainer 604 can use a sample load to train one or more models agnostic to telemetry data created from actually running a job in a remote cluster computing system. The model trainer 604 can use load samples provided as an input to train one or more models. Additionally, the model trainer 604 can use the load samples to generate replicated loads to mimic a production level. Specifically, the model trainer 604 can generate indicative load samples covering a subset or an entire load range to deeply study the job as the data input size is linearly increased from small loads till production load levels. As regions do appear to be independent of the number of nodes used in the cluster, a number of load regions and boundaries of each load region can identified. Subsequently, the model trainer can generate one or more accurate prediction models of how the completion times will behave as a function of different number of nodes in each region, corresponding to different cluster configurations. In turn, bottleneck conditions can be predicted and Equation 3 and Equation 4 can learn associated impacts of the bottleneck conditions The model trainer 604 can use a top-down hierarchical clustering technique with a binary tree structure. More specifically, the model trainer 604 can treat the load horizon, e.g. the entire range of loads of a production load, as a single region as the root of the tree, which can then subdivided (split) into a set of two small clusters, i.e., load regions, each represented as a node in the binary tree structure. The model trainer 604 can carry out this process recursively until each cluster (load region), represented as a leaf node, can be modeled with a relative error (difference between measured completion times and estimated completion times) smaller than a maximum allowed residual error defined as an input of the process. A more relaxed value of the residual error can lead to more compacted binary trees, hence regions. Conversely, a more stringent value of the not-to-exceed residual error can lead to larger number of leaf nodes, hence load regions. For example, let's assume 5 load values cover $R_0=\{L_1, L_2, L_3, L_4, L_5\}$. Then the estimation model (Equation 3) can then be computed for the root node $R_0$. If the residual error is less than a maximum allowed residual error, then $R_0$ becomes the load value as only one region is needed. Conversely, if the relative error is greater than maximum allowed residual error, the model trainer 604 can split $R_0$ into two children nodes $R_1=\{L_1, L_2\}$ and $R_2=\{L_3, L_4, L_5\}$ and can compute the residual error of each region. The model trainer 604 can keep iterating through till all the leave nodes of the binary tree have a residual error less than the maximum allowed value.

As soon as the regions are identified and the multi-linear regression models are computed for n=1 . . . 5, then the cluster configuration specific job forecasting engine 606 can uses Equation 4 to forecast completion times for clusters of larger size (n>5). More specifically, the cluster configuration specific job forecasting engine 606 can use Equation 4 to forecast completion times for clusters of larger size at production loads across varying cluster configurations. Additionally, the cluster configuration specific job forecasting engine 606 can use Equation 4 to forecast completion times for larger numbers of clusters forming varying cluster configurations at production loads. In various embodiments, accurate profiling is capable without using telemetry data. Additionally, the optimal cluster configuration profiler 600 is able to gain a thorough understanding of the job behavior across a variety of load levels. This can come at the cost of executing experiments (6-8 loads for clusters with at least 2 number of nodes configuration, e.g., nodes=2 and 3) with sample of loads spanning the entire load horizon.

In various embodiments, the model trainer 604 can use a sample load to train one or more models in addition to telemetry data created from actually running a job in a remote cluster computing system. More specifically, the model trainer 604 can monitor a metric vector, i.e., a vector which captures a variety of system-level metrics at job completion time (i.e. a system-level summary blob), for every run executed in the training region.

TABLE 2

| Host Metrics | Description |
| --- | --- |
| NUM_EXEC | Number of executors hosted |
| NUM_TASK_EXEC | Number of tasks assigned (per executor) |
| NUM_FAILED_TASK_EXEC | Number of failed tasks (per executor) |
| TASK_TIME_EXEC | Task completion time (per executor) |
| INPUT_TO HEAP_RATIO_EXEC | Ratio of Input size to Heap (%, per executor) |
| CPU_UTIL_EXEC | CPU utilization (%, per executor) |
| MEM_SHUFFLE_UTIL_EXEC | Shuffle memory utilization (%, per executor) |
| MEM_STORAGE_UTIL_EXEC | Storage memory utilization (%, per executor) |
| DISK_THR_EXEC (R + W) | Disk Throughput (R + W, %, per host) |
| DISK_FREE_SPACE | Disk Utilization (R + W, %, per host) |
| GC_SIZE | Size of Garbage Collection (per host) |
| NETW_IO UTIL | Network Utilization I/O (%, per host) |

Table 2 shows system metrics that can be monitored over time as a job is carried out in a remote computing system, e.g. using telemetry data generated for the job. These metrics tend to be linear as a function of the offered load; as a result, a linear regression model seems to be a good model to forecast those metrics outside the training region. For each metric of the metric vector, we define a maximum value, i.e., a value that when crossed the system is considered to enter a pressure zone and hence likely facing a bottleneck condition. When the cluster configuration specific job forecasting engine 606 estimates the expected times at production level, it checks whether any of the vector metrics is over their maximum value. If all metrics are below their maximum value, then the cluster configuration specific job forecasting engine 606 can annotate the cluster configuration as normal. Conversely, if one or more metrics are forecasted above their maximum values, then the cluster configuration specific job forecasting engine 606 can annotate the configuration as abnormal or likely to fail. For a cluster annotated as normal at production load (e.g., nodes=3 of maximum allowed nodes in the cluster equal to 5), The optimal cluster configuration profiler 600 can estimate Equation 3 and 5 in a training regime and forecast completion times at production load (for both n>=3 in this case). If the system is predicted to be in an abnormal state at production load (e.g., n=3), the optimal cluster configuration profiler 600 will mark the n=3 node configuration as abnormal, and disregard the cluster configuration. It then can try with an increased number of nodes to distribute the computation overhead across more (e.g., n=4).

Figure 9:
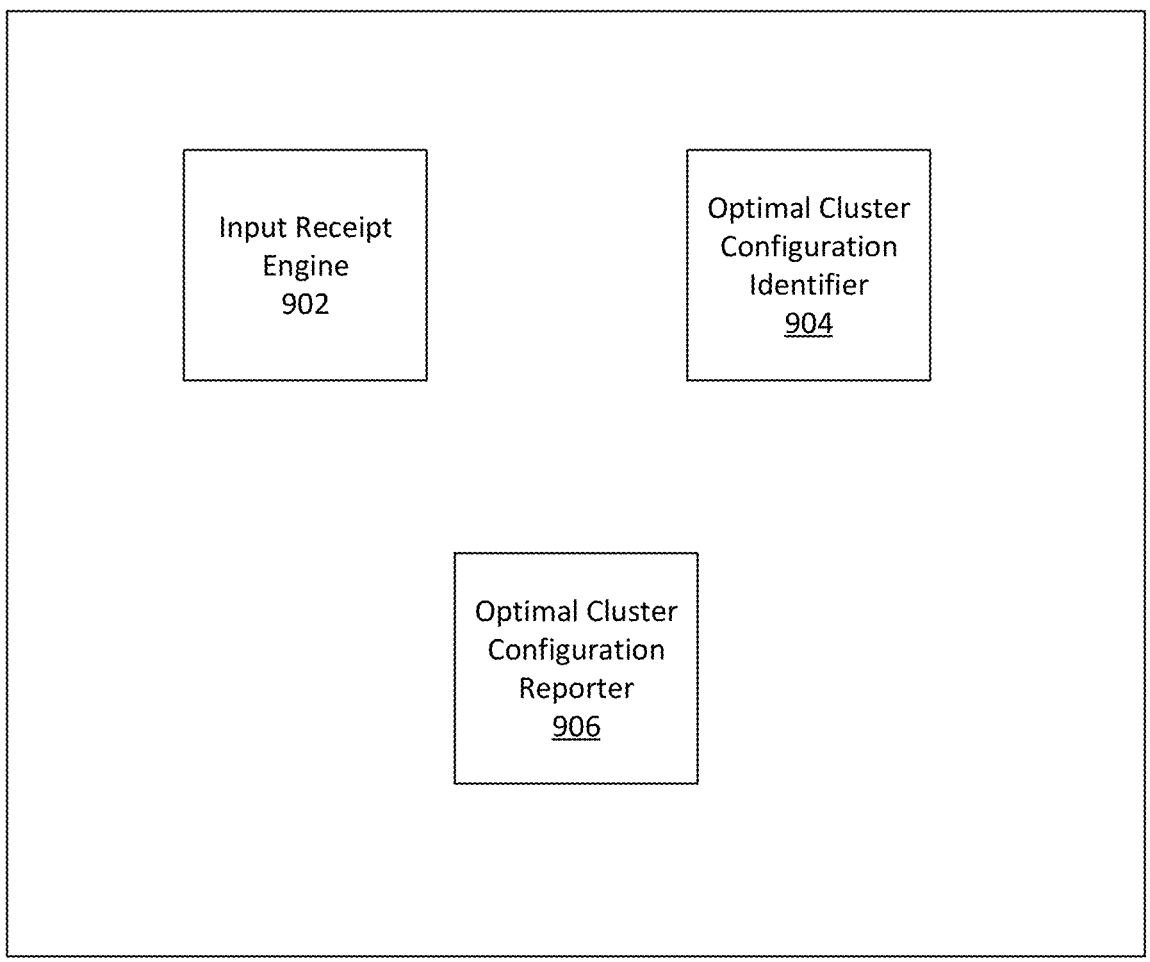
FIG. 9 is a diagram of an example optimal cluster configuration solver.

FIG. 9 is a diagram of an example optimal cluster configuration solver 900. The optimal cluster configuration solver 900 shown in FIG. 9 can function according to an applicable solver for identifying optimal cluster configurations, such as the optimal cluster configuration solver 308 shown in FIG. 3. The optimal cluster configuration solver 900 can identify an optimal cluster configurations based on one or a combination of estimated completion times of a job across varying cluster configurations, costs per unit in a remote computing system, otherwise costs of renting varying cluster configurations in the remote computing system, and a completion deadline or service level objective of a job. For example, the optimal cluster configuration solver 900 can identify a cheapest cluster configuration that will get a job done by a deadline for the job as an optimal cluster configuration for the job.

The optimal cluster configuration solver 900 includes an input receipt engine 902, an optimal cluster configuration identifier 904, and an optimal cluster configuration reporter. The input receipt engine 902 functions to receive input for identifying optimal cluster configurations. In receiving job input for identifying optimal cluster configurations for a job, the input receipt engine 902 can receive one or a combination of estimated completion times of the job across varying cluster configurations, indications of costs of renting the varying cluster configurations in a remote cluster computing system, and a service deadline for the job. More specifically, the input receipt engine 902 can receive estimated completion times of a job from an applicable profiler for estimating completion times of a job across varying cluster configurations, such as the optimal cluster configuration profiler 306 and the optimal cluster configuration profiler 600. Additionally, the input receipt engine 902 can receive indications of costs to rent varying cluster configurations in a remote cluster computing system from the cluster computing system itself. Further, the input receipt engine 902 can receive a service deadline for a job as part of user input received for the job.

FIG. 10 shows a sample of input 1000 received by the input receipt engine 902. In particular, the input 1000 shown in FIG. 10 includes estimated completion times for a job. In particular, the input 1000 shows that the estimated completion time begins to increase when the job is executed on greater than 6 nodes. Additionally, the input 1000 includes a service level objective deadline of 90.

The input receipt engine 902 can receive telemetry data of a job being performed in a remote cluster computing system as the job is actually being performed. For example, the input receipt engine 902 can receive telemetry data indicating actual completion times of portions of a job in a remote cluster computing system. Subsequently, the telemetry data can be used to confirm whether a currently utilized cluster configuration is actually an optimal cluster configuration or whether to select a new optimal cluster configuration. Further, if it is determined to select a new optimal cluster configuration, then the telemetry data can be used, at least in part, to select the new optimal cluster configuration.

The optimal cluster configuration identifier 904 functions to select one or more optimal cluster configurations for a job in a remote cluster computing system. The optimal cluster configuration identifier 904 can select one or more optimal cluster configurations based on input received by the input receipt engine 902. More specifically, the optimal cluster configuration identifier 904 can use one or a combination of estimated completion times of a job across varying cluster configurations, costs to rent the varying cluster configurations in a remote cluster computing system, and a deadline for the job to identify one or more optimal cluster configurations for the job. For example, the optimal cluster configuration identifier 904 can select a cluster configuration that performs a job fastest in a remote cluster computing system as an optimal cluster configuration.

The optimal cluster configuration reporter 906 functions to communicate to a user one or more optimal cluster configurations identified by the optimal cluster configuration identifier. In reporting one or more optimal cluster configurations to a user, the optimal cluster configuration reporter 906 can report costs of renting the one or more cluster configurations as well as estimated completion times of the job using the one or more optimal cluster configurations. Additionally, the optimal cluster configuration reporter 906 can present a cost benefit report to a user. A cost benefit report can compare costs benefits of a plurality of identified optimal cluster configurations. Additionally, a cost benefit report can compare costs benefits of one or more optimal cluster configurations and a current cluster configuration being used to carry out a job in a remote cluster computing system.

Figure 11:
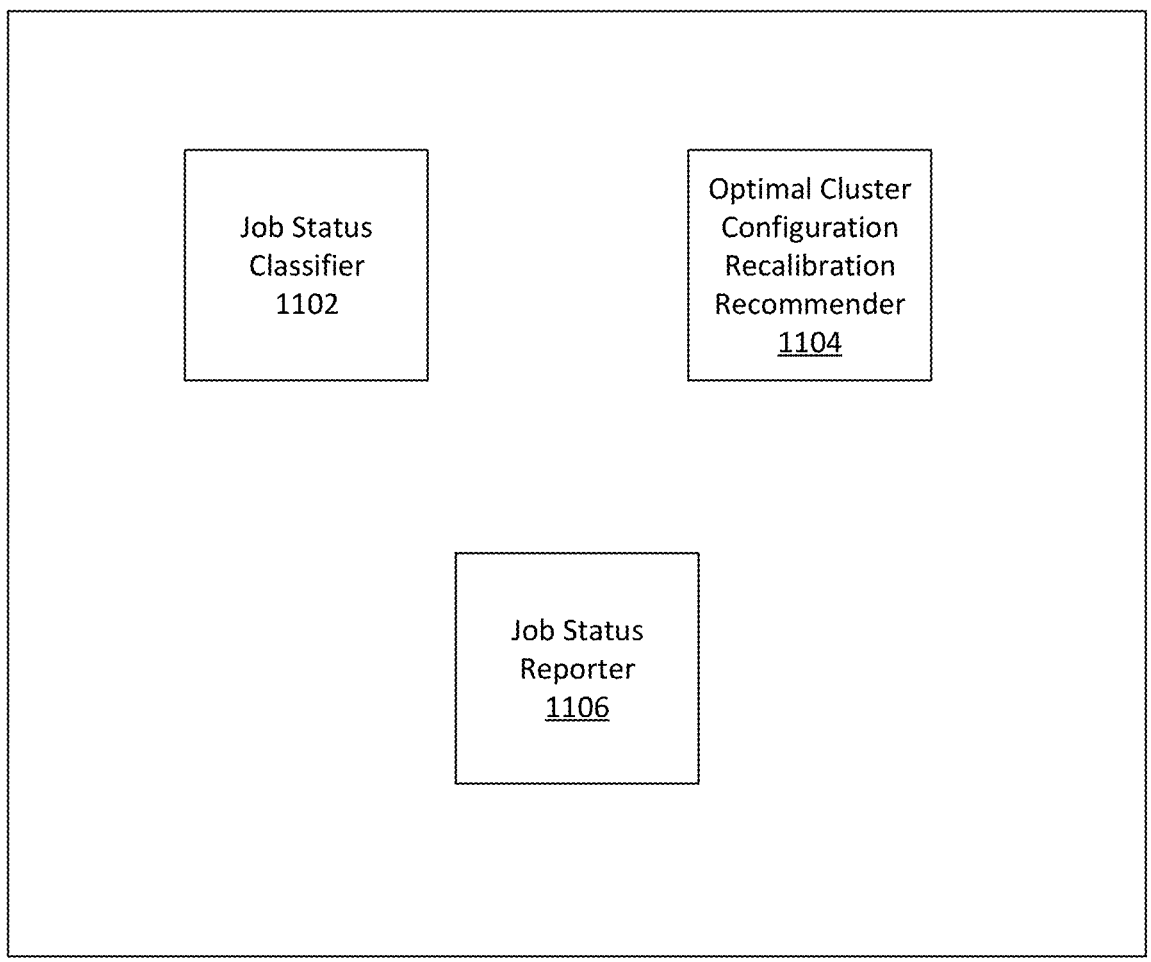
FIG. 11 is a diagram of an example remote cluster computing system watcher.

FIG. 11 is a diagram of an example remote cluster computing system watcher 1100. The remote cluster computing system watcher 1100 shown in FIG. 11 can function according to an applicable watcher of a job in a remote cluster computing system, such as the remote cluster computing system watcher 310 shown in FIG. 3. The remote cluster computing system watcher 1100 can monitor a job performed in a remote cluster computing system. More specifically, the remote cluster computing system watcher 1100 can monitor a job performed on an optimal cluster configuration selected by an applicable system for selecting an optimal cluster configuration in a remote cluster computing system for a job, such as the optimal cluster configuration identification system 300 shown in FIG. 3. In observing a job performed in a remote cluster computing system, the remote cluster computing system watcher 1100 can gather and generate telemetry data for the job. For example, the remote cluster computing system watcher 1100 can generate alerts for a job in response to detected or predicted abnormalities in performance of the job in a remote cluster computing system.

The remote cluster computing system watcher 1100 can monitor system metrics collected during a job runtime and subsequently generate predictive alerts if the system is drifting away from its normal operational behavior. Given a training data set of such measures, the remote cluster computing system watcher 1100 can build use a model to classify a current status of a job as the job is being run in a remote cluster computing system. The remote cluster computing system watcher 1100 can classify a current status of job into normal and abnormal states using the model. Additionally, the remote cluster computing system watcher 1100 can use the model to classify or otherwise identify future states of a job as the job is performed in a remote cluster computing system.

In response to detecting anomalies, the remote cluster computing system watcher 1100 can inform a user one or a combination of that a job is deviating from its normal behavior, potential impacts of the deviation, and causes which led the job to deviate away from its normal state. Additionally, in response to detecting anomalies, the remote cluster computing system watcher 1100 can perform recalibration action, which informs an optimal cluster configuration profiler of the need of a new cluster configuration with intelligent suggestions on what actions to take as part of telemetry data (e.g., increase the number of nodes in the cluster, or increase the memory assigned to each executor, or more efficient redistribution of executors in the host pool, etc.).

The remote cluster computing system watcher 1100 includes a job status classifier 1102, an optimal cluster configuration recalibration recommender 1104, and a job status reporter 1106. The job status classifier 1102 functions to identify a status of a job, as part of profiling the job as it is run in a remote cluster computing system. In identifying a status of a job, the job status classifier 1102 can classify a status of a job as either normal or abnormal. For example, the job status classifier 1102 can identify a job as abnormal if it is exhibiting abnormalities/anomalies in running in remote cluster computing system. The job status classifier 1102 can identify either or both a current status of a job and a future status of a job. For example, based on current behaviors exhibited during execution of a job, the job status classifier 1102 can identify that in the future, the job will begin to exhibit abnormal behaviors.

The job status classifier 1102 can integrate a naïve Bayesian classification method and discrete Markov models to profile a job execution in time (start till completion) when running on a recommended or selected optimal cluster configuration. The job status classifier 1102 can use the same statistics presented in Table 1 to profile a job execution in time. More specifically, the job status classifier 1102 can use measurements from a training cluster, e.g. the instantiated cluster configurations, to train a set of Bayesian classifiers aimed at capturing the distinct symptoms of different bottlenecks caused by various reasons. This can subsequently be used to train a model for use in classifying a current status of a job. Further, the job status classifier 1102 can utilize discrete Markov models (one discrete Markov-chain of a finite number of states, where each state represents a feature value) to capture the changing patterns of different measurement metrics that are used as features by the Bayesian classifiers. This can be used to train a model for use in classifying future statuses of a job. Through Markov chains, the job status classifier 1102 can predict values of each metric for the next k time bins. The Bayesian classifier can then be used to predict the probability of different anomaly symptoms by combining the metric values.

More specifically, the job status classifier 1102 can train a model for identifying current and future statuses of a job according to the following. For each type of anomaly/abnormality, a training dataset consists of records in the form of $(x,c)$, where x is a vector of system measurements, and c=Yes/No indicative whether x represents an anomaly condition. Thus, a model learned from the training dataset only enables the job status classifier 1102 to predict whether the current data x represents an anomaly condition, instead of whether an anomaly will occur in the future.

To find out whether an anomaly condition will occur in a future time unit, the job status classifier 1102 can assume that X, the probability density function of x in that future time unit: X~p(x), is known. Later it will be described how the job status classifier 1102 derives X, the probability density. It is noted that p(x) is different from the estimated prior distribution p(x|D) that can be obtained from the training telemetry data D. The job status classifier 1102 can consider each observation in D as an independent sample from an unknown distribution, while the job status classifier 1102 is able to identify p(x) through some estimation mechanism. In this case, the job status classifier 1102 can take advantage of the temporal locality of the data and predict their values in the future time units from their current values.

Assume a classifier that outputs the posterior probabilities of anomaly/normal, i.e., it outputs P(C=anomaly|x) and P(C=normal|x) for a given x. X~p(x) gives p(x), the distribution of feature values in a future time, with which the job status classifier 1102 can compute the expected logarithmic posterior probabilities:

$$E_X(\log P(C=c|x)) = \int_x (\log P(C=c|x))p(x)dx \quad \text{Equation 5}$$

The job status classifier 1102 can thus make prediction about the future state. That is, the job status classifier 1102 can predict an anomaly if, $$E_X(\log P(\text{anomaly}|x)) \geq E_X(\log P(\text{normal}|x)) \quad \text{Equation 6}$$

Since the job status classifier 1102 is classifying unseen measurements, the concern about prediction quality comes more from uncertainty about the future measurements rather than from the quality of the classifier itself. In order to measure the certainty of our prediction, the job status classifier 1102 can compare the expected logarithmic posterior probabilities for anomaly and normal:

$$\delta = E_X(\log P(\text{anomaly}|x)) - E_X(\log(P(\text{normal}|x)) \quad \text{Equation 7}$$

The value of $|\delta|$ indicates the confidence of a prediction made by the job status classifier 1102: the larger the $|\delta|$, the more confidence that exists in the prediction (either anomaly or normal). The job status classifier 1102 can raise an alert if $|\delta|>d|$, where d is a constant value that represents the confidence threshold of the alert.

The job status classifier 1102 can choose a reasonable value of d. In system monitoring, an anomaly is a rare event, meaning most of the times the system is likely to operate in a normal state. In other words, $$\delta_0 = \log P(\text{anomaly}) - \log P(\text{normal}) < 0 \quad \text{Equation 8}$$

If x covers a large feature space, then only a small region in that feature space represents anomalies. Value $\delta_0$ is the prior difference of the likelihood, and usually it is less than 0. If $\delta$, the expected difference in the future, is larger than $\delta_0$, then there are reasons to believe that the job is less healthy than it normally is. Thus, the job status classifier 1102 sets $d=\delta_0$, and the job status classifier 1102 can raise an alert if, $$\delta \geq \delta_0 \quad \text{Equation 9}$$

This corresponds to when the difference between anomaly and normal likelihood in a future time unit is more significant than indicated by their prior differences.

It can be computationally challenging, according to Equation 5, to compute $E_X$ (log P(C=c|x)). Specifically, the job status classifier 1102 can evaluate P(C=c|x) for every possible x in the multi-dimensional feature space. If the dimensionality is high, the computation will be very costly or even infeasible. To solve this problem, the job status classifier 1102 can make an assumption that each metric is conditionally independent given the class labels. With this assumption, a very simple classifier, the naïve Bayesian classifier, can be applied. With the Bayesian classifier, $$E_X(\log P(c|x)) = E_X\left(\log\frac{P(x|c)P(c)}{\Sigma_c P(x|c)P(c)}\right) \quad \text{Equation 10}$$

Once Equation 7 is used, the denominator of Equation 10 will disappear in the log ratio. In other words, whether an alert will be raised or not depends on the relative value. So the job status classifier 1102 ignores the denominator and derives the following:

$$E_X[\log(P(x|c) \ P(c))] = E_X \log P(x|c) + E_X \log P(c) = \quad \text{Equation 11}$$
$$\sum_i E_{X_i} \log P(x_i|c) + \log P(c)$$

Thus, instead of having to compute $E_X$(log P(c|x)), the job status classifier 1102 only needs to compute $E_{X_i}$(log P($x_i$|c)), that is instead of relying on the joint density function X~p(x), the job status classifier 1102 can only rely on the distribution of each feature $X_j$~p($x_j$). This is much easier to obtain, and makes computation of Equation 5 feasible.

Up until now, the discussion of profiling a job by the job status classifier 1102 has assumed that the feature distribution in a future time unit is known. The following discusses how the job status classifier 1102 derives a future feature distribution for identifying a future status of a job.

Consider any system metric x. The job status classifier 1102 can separate system metric x values into M bins by equi-depth discretization. The reason the job status classifier 1102 uses equi-depth discretization is that some system metrics have outlier values, which makes traditional equi-width discretization suboptimal. The job status classifier 1102 can then build a Markov-chain for that system metric, that is, the job status classifier 1102 can learn the state transition matrix $P_x$ for the system metric x. Assume the feature value at time $t_0$:x=$s_i$, 1≤i≤M is known. The distribution of the feature value at time $t_0$ can be expressed as $p_0(x)=e_i$ where $e_i$ is a 1×Munit row vector with 1 at position i and 0's at other positions. The distribution of the feature value in the next time unit $t_1$ can be expressed as $p_1(x)=p_0(x)P_x=e_iP_x$. Thus, the job status classifier 1102 can derive the feature value distribution of x for any time in the future: at time $t_i$, the distribution is $p_i(x)$. Clearly, when i becomes large, the distribution will converge to p(x)=π, where π is the prior distribution (among the historic data based on which we have built the Markov-chain) of the features value. In other words, the probability of a certain feature value in the next time unit is approximately the fraction of its occurrence in the historic data. But, as the gap between the current time and the time when we last investigated the feature values becomes larger, the temporal correlation will disappear. Now, in order to answer the question whether and when an anomaly condition will occur in the foreseeable future, the job status classifier 1102 can input $p_i(x)$, ∀i into Equation 7. Subsequently, an alert can be raised for time t if the feature distributions at time t makes δ>d. In order for our Markov-chain to reflect the characteristics of the most recent data, we adopt a finite-memory Markov-chain, which is a sliding window of the most recent W transitions.

The job status classifier 1102 can invoke a Bayesian learning method, as discussed above, to train a model for each type of anomaly. Specifically, the job status classifier 1102 can periodically train models using a Bayesian classifier for each anomaly type. In other words, the job status classifier 1102 can induce a set of binary classifiers $\{C_1, \ldots, C_k\}$ so that for each unlabeled sample x, $C_i$ will make a binary decision of whether or not x is a case of anomaly type i. This method simply computes the frequency of anomaly and normal cases for each attribute value (after equi-depth discretization). However, in a small training dataset, we may find certain attribute values having zero frequency: $p(x_i=j|c)=0$. A testing sample with that feature value will always have zero posterior probability according to the Bayesian rule. To alleviate this problem, the job status classifier can assume there are m imaginary cases whose feature values have equal probability of being in any bin (m-estimate). The likelihood probabilities using m-estimate are then computed.

The job status classifier 1102 can raise a user alert according to the following. The job status classifier 1102 can take system measures generated at equally spaced time interval (for example, each interval is 5 seconds), and decide if an alert should be raised. Specifically, the job status classifier 1102 can return an integer value s to indicate that the next anomaly is likely to occur after s≥1 time units in the future. If the return value is 0, it means no anomaly is predicted to happen within up to N time units in the future. Note that for presentation simplicity, the job status classifier 1102 is described in raising an alert for one single anomaly type. However, it is straightforward to modify this method of raising an alert to provide alert for all anomaly types.

The optimal cluster configuration recalibration recommender 1104 functions to determine or make suggestions as to how an optimal cluster configuration can be recalibrated. More specifically, the optimal cluster configuration recalibration recommender 1104 can identify or make suggestions for recalculating an optimal cluster configuration in response to an identified anomaly in running of a job, either current or in the future. For example, the optimal cluster configuration recalibration recommender 1104 can identify recalibration actions (e.g., increase the number of nodes in the cluster, or increase the memory assigned to each executor, or more efficient redistribution of executors in the host pool, etc.), to make in calculating a new optimal cluster configuration. The optimal cluster configuration recalibration recommender 1104 can identify recalibration actions based on characteristics of an identified abnormality. For example, if a job is experiencing a bottleneck characterized by increase CPU usage, then the optimal cluster configuration recalibration recommender 1104 can suggest reducing a number of nodes included in a cluster of nodes used to perform the job.

The job status reporter 1106 functions to provide telemetry data including both gathered and generated data to a user. For example, the job status reporter 1106 can provide an alert to a user when the job status classifier 1102 raises an alert. Additionally, the job status reporter 1106 functions to provide telemetry data including both gathered and generated data to an applicable system for identifying estimated completion times of a job across varying cluster configurations, such as the optimal cluster configuration profiler 600. For example, the job status reporter 1106 can provide recalibration actions identified by the optimal cluster configuration recalibration recommender 1104 to the optimal cluster configuration profiler 600.

The disclosure now turns to FIGS. 12 and 13, which illustrate example computing devices, such as switches, routers, load balancers, client devices, and so forth.

FIG. 12 shows an example of computing system 1200 in which the components of the system are in communication with each other using connection 1205. Connection 1205 can be a physical connection via a bus, or a direct connection into processor 1210, such as in a chipset architecture. Connection 1205 can also be a virtual connection, networked connection, or logical connection.

In some embodiments computing system 1200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read only memory (ROM) and random access memory (RAM) to processor 1210. Computing system 1200 can include a cache of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

FIG. 13 illustrates a computing system architecture 1300 wherein the components of the system are in electrical communication with each other using a connection 1305, such as a bus. Exemplary system 1300 includes a processing unit (CPU or processor) 1310 and a system connection 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the actual processor design. The processor 1310 may be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include services 1332, 1334, 1336 for controlling the processor 1310. Other hardware or software modules are contemplated. The storage device 1330 can be connected to the system connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving job input including one or more applications and a sample of a production load of a job to be outsourced to a remote cluster computing system;

generating an application recommendation vector for the job using the job input, wherein the application recommendation vector includes values of parameters of the remote cluster computing system that are independent of cluster configuration in the remote cluster computing system for running the one or more applications in the remote cluster computing system;
instantiating different clusters of nodes to form different cluster configurations in the remote cluster computing system;
forecasting the job in the remote cluster computing system by identifying expected completion times of the production load across varying cluster configurations using one or more multi-linear regression models segmented into parts by different load regions, wherein the one or more multi-linear regression models are trained by running at least a portion of the sample of the production load on the different clusters of nodes with the different cluster configurations in the remote cluster computing system using the one or more applications based on the application recommendation vector; and
identifying an optimal cluster configuration of the varying cluster configurations for the job in the remote cluster computing system based on the identified expected completion times of the production load across the varying cluster configurations.

2. The method of claim 1, wherein the different cluster configurations and the varying cluster configurations differ by varying one or a combination of hardware parameters of one or more nodes to form the different cluster configurations and the varying cluster configurations, a number of nodes of the one or more nodes to form the different cluster configurations and the varying cluster configurations, and resource allocation of the of one or more the nodes to form the different cluster configurations and the varying cluster configurations.

3. The method of claim 1, wherein the application recommendation vector is generated by performing test runs of the one or more applications at different values of parameters of the remote cluster computing system in running the one or more applications according to a knowledge-based decision tree for the remote cluster computing system.

4. The method of claim 3, wherein the parameters of the remote cluster computing system in running the one or more applications are selected using parametric pruning of a plurality of parameters of the remote cluster computing system in running the one or more applications and the parameters of the remote cluster computing system selected using parametric pruning from the plurality of parameters of the remote cluster computing system are used to form the knowledge-based decision tree for the remote cluster computing system.

5. The method of claim 1, wherein either or both a number of clusters of nodes and a number of nodes in the different clusters of nodes instantiated and used to train the one or multi-linear regression models is less than either or both a job level number of nodes and a job level number of clusters of nodes of the varying cluster configurations that can be used to complete the job in the remote cluster computing system in order to reduce an amount of resources of the remote cluster computing system used in forecasting the job in the remote cluster system.

6. The method of claim 1, wherein the one or more multi-linear regression models are trained using a combination of sequential computations occurring while running either or both the at least a portion of the sample of the production load or one or more replicated loads generated from the at least the portion of the sample of the production load on a single node in the different clusters of nodes, parallel computations occurring while running either or both the at least a portion of the sample of the production load or the replicated loads on the single node in the different clusters of nodes, and inter-node communications and repeat computations occurring while running either or both the at least a portion of the sample of the production load or the replicated loads on a plurality of nodes in the different clusters of nodes.

7. The method of claim 1, wherein a separation of at least two of the different load regions corresponds to a bottleneck occurring during running of either or both the sample of the production load or a replicated load created from the sample of the production load on the different clusters of nodes with the different cluster configurations.

8. The method of claim 1, further comprising:
replicating loads varying in size across a training region using the sample of the production load to generate replicated loads;
running the replicated loads on the different clusters of nodes with the different cluster configurations in the remote cluster computing system to identify measured completion times for the replicated loads; and
modifying the one or more multi-linear regression models by adjusting load regions of the different load regions in the one or more multi-linear regression models and within the training region until a difference between predicted completion times for the replicated loads, as indicated by the one or more multi-linear regression models, and the measured completion times for the replicated loads is less than or equal to an allowed residual error level.

9. The method of claim 1, wherein a training region corresponding to the load regions encompasses a load size of a replication of the production load.

10. The method of claim 1, further comprising:
receiving input indicating a service level objective deadline for the job in the remote cluster system; and
identifying the optimal cluster configuration of the varying cluster configurations for the job based on both the service level objective deadline and the identified expected completion times of the production load across the varying cluster configurations.

11. The method of claim 1, further comprising:
receiving input indicating a service level objective deadline for the job in the remote cluster system;
determining cost per time for leasing the varying cluster configurations; and
identifying the optimal cluster configuration of the varying cluster configurations for the job based on the service level objective deadline, the identified expected completion times of the production load across the varying cluster configurations, and the cost per time for leasing the varying cluster configurations.

12. The method of claim 1, further comprising:
receiving telemetry data of the job running on the remote cluster computing system using the optimal cluster configuration;
identifying from the telemetry data abnormalities or bottlenecks occurring during performance of the job in the remote cluster computing system using the optimal cluster configuration; and
updating the one or more multi-linear regression models to create updated one or more multi-linear regression models using the telemetry data based on the detected abnormalities or bottlenecks occurring during performance of the job in the remote cluster computer system using the optimal cluster configuration.

13. The method of claim 12, further comprising identifying a new optimal cluster configuration of the varying cluster configurations for the job in the remote cluster computer system using the updated one or more multi-linear regression models.

14. A system comprising:
one or more processors; and
at least one computer-readable storage medium having stored therein instructions which, when executed by the one or more processors, cause the one or more processors to perform operations comprising:
receiving job input including one or more applications and a sample of a production load of a job to be outsourced to a remote cluster computing system;
generating an application recommendation vector for the job using the job input, wherein the application recommendation vector includes values of parameters of the remote cluster computing system that are independent of cluster configuration in the remote cluster computing system for running the one or more applications in the remote cluster computing system;
instantiating different clusters of nodes to form different cluster configurations in the remote cluster computing system;
forecasting the job in the remote cluster computing system by identifying expected completion times of the production load across varying cluster configurations using one or more multi-linear regression models segmented into parts by different load regions, wherein the one or more multi-linear regression models are trained by running at least a portion of the sample of the production load on the clusters of nodes with different cluster configurations in the remote cluster computing system using the one or more applications based on the application recommendation vector; and
identifying an optimal cluster configuration of the varying cluster configurations for the job in the remote cluster computing system based on the identified expected completion times of the production load across the varying cluster configurations.

15. The system of claim 14, wherein either or both a number of clusters of nodes and a number of nodes in the different clusters of nodes instantiated and used to train the one or multi-linear regression models is less than either or both a job level number of nodes and a job level number of clusters of nodes of the varying cluster configurations that can be used to complete the job in the remote cluster computing system in order to reduce an amount of resources of the remote cluster computing system used in forecasting the job in the remote cluster system.

16. The system of claim 14, wherein the instructions which, when executed by the one or more processors, further cause the one or more processors to perform operations comprising:
replicating loads varying in size across a training region using the sample of the production load to generate replicated loads;
running the replicated loads on the different clusters of nodes with the different cluster configurations in the remote cluster computing system to identify measured completion times for the replicated loads; and
modifying the one or more multi-linear regression models by adjusting load regions of the different load regions in the one or more multi-linear regression models and within the training region until a difference between predicted completion times for the replicated loads, as indicated by the one or more multi-linear regression models, and the measured completion times for the replicated loads is less than or equal to an allowed residual error level.

17. The system of claim 14, wherein the instructions which, when executed by the one or more processors, further cause the one or more processors to perform operations comprising:
receiving input indicating a service level objective deadline for the job in the remote cluster system;
determining cost per time for leasing the varying cluster configurations; and
identifying the optimal cluster configuration of the varying cluster configurations for the job based on the service level objective deadline, the identified expected completion times of the production load across the varying cluster configurations, and the cost per time for leasing the varying cluster configurations.

18. A non-transitory computer-readable storage medium having stored therein instructions which, when executed by a processor, cause the processor to perform operations comprising:
receiving job input including one or more applications and a sample of a production load of a job to be outsourced to a remote cluster computing system;
generating an application recommendation vector for the job using the job input, wherein the application recommendation vector includes values of parameters of the remote cluster computing system that are independent of cluster configuration in the remote cluster computing system for running the one or more applications in the remote cluster computing system;
instantiating different clusters of nodes to form different cluster configurations in the remote cluster computing system;
forecasting the job in the remote cluster computing system by identifying expected completion times of the production load across varying cluster configurations using one or more multi-linear regression models segmented into parts by different load regions, wherein the one or more multi-linear regression models are trained by running at least a portion of the sample of the production load on the different clusters of nodes with the different cluster configurations in the remote cluster computing system using the one or more applications based on the application recommendation vector; and
identifying an optimal cluster configuration of the varying cluster configurations for the job in the remote cluster computing system based on the identified expected completion times of the production load across the varying cluster configurations.

19. The system of claim 14, wherein the instructions which, when executed by the one or more processors, further cause the one or more processors to perform operations comprising generating the application recommendation vector by performing test runs of the one or more applications at different values of parameters of the remote cluster computing system in running the one or more applications according to a knowledge-based decision tree for the remote cluster computing system.

20. The system of claim 14, wherein a training region corresponding to the load regions encompasses a load size of a replication of the production load.

* * * * *